US008873982B2

(12) United States Patent
Yoshida

(10) Patent No.: US 8,873,982 B2
(45) Date of Patent: Oct. 28, 2014

(54) IMAGE FORMING APPARATUS WITH MECHANISM CAPABLE OF MOVING TRANSFER DEVICE WITH RESPECT TO TONER IMAGE CARRIER AND IMAGE FORMING METHOD FOR MOVING TRANSFER DEVICE WITH RESPECT TO TONER IMAGE CARRIER

(75) Inventor: Ken Yoshida, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 102 days.

(21) Appl. No.: 13/609,955

(22) Filed: Sep. 11, 2012

(65) Prior Publication Data

US 2013/0077984 A1 Mar. 28, 2013

(30) Foreign Application Priority Data

Sep. 28, 2011 (JP) ................................ 2011-212692

(51) Int. Cl.
*G03G 15/00* (2006.01)
*G03G 15/01* (2006.01)
*G03G 15/16* (2006.01)

(52) U.S. Cl.
CPC .... *G03G 15/1605* (2013.01); *G03G 2215/0129* (2013.01); *G03G 2215/0193* (2013.01); *G02G 2215/00059* (2013.01); *G03G 15/0131* (2013.01); *G03G 15/5058* (2013.01)
USPC ........................................................... 399/66

(58) Field of Classification Search
CPC ...................................................... G03G 15/00
USPC ........................................................... 399/66
See application file for complete search history.

(56) References Cited

U.S. PATENT DOCUMENTS

| | | | | |
|---|---|---|---|---|
| 5,729,788 | A * | 3/1998 | Hirohashi et al. | 399/66 |
| 6,246,844 | B1 * | 6/2001 | Shiba | 399/49 |
| 6,389,242 | B1 * | 5/2002 | Watanabe | 399/45 |
| 6,862,421 | B2 * | 3/2005 | Choi | 399/302 |
| 7,239,835 | B2 * | 7/2007 | Ito et al. | 399/313 |
| 7,274,888 | B2 * | 9/2007 | Tomizawa | 399/49 |

(Continued)

FOREIGN PATENT DOCUMENTS

| | | |
|---|---|---|
| JP | 8-248787 | 9/1996 |
| JP | 8-314297 | 11/1996 |

(Continued)

OTHER PUBLICATIONS

U.S. Appl. No. 13/402,290, filed Feb. 22, 2012, Ken Yoshida.

*Primary Examiner* — Clayton E LaBalle
*Assistant Examiner* — Kevin Butler
(74) *Attorney, Agent, or Firm* — Oblon, Spivak, McClelland, Maier & Neustadt, L.L.P.

(57) ABSTRACT

An image forming apparatus includes a transfer device separator that moves a transfer device between a contact position and a first isolation position within a shortened time. At the contact position, the transfer device contacts a toner image carrier. At the first isolation position, the transfer device is isolated from the toner image carrier with a first interval therebetween. A controller controls the transfer device separator to move the transfer device to the contact position as first to third toner images and a blank section between the first toner image and the second toner image carried by the toner image carrier pass through a transfer region and to the first isolation position as a toner patch section between the first toner image and the second toner image carried by the toner image carrier passes through the transfer region.

19 Claims, 10 Drawing Sheets

(56) References Cited

U.S. PATENT DOCUMENTS

| | | | | |
|---|---|---|---|---|
| 7,813,662 | B2 * | 10/2010 | Muto et al. | 399/66 |
| 8,107,848 | B2 * | 1/2012 | Nozawa et al. | 399/101 |
| 8,290,413 | B2 * | 10/2012 | Kobayashi et al. | 399/299 |
| 2004/0136760 | A1 | 7/2004 | Yoshida et al. | |
| 2005/0013636 | A1 | 1/2005 | Sawai et al. | |
| 2005/0147424 | A1 | 7/2005 | Kato et al. | |
| 2005/0254853 | A1 | 11/2005 | Yoshida | |
| 2006/0062593 | A1 * | 3/2006 | Takahashi | 399/121 |
| 2007/0127960 | A1 | 6/2007 | Yoshida | |
| 2007/0134014 | A1 | 6/2007 | Kato et al. | |
| 2007/0280748 | A1 | 12/2007 | Yoshida | |
| 2008/0088883 | A1 | 4/2008 | Yoshida | |
| 2008/0279589 | A1 * | 11/2008 | Muto et al. | 399/170 |
| 2009/0016784 | A1 | 1/2009 | Yoshida | |
| 2009/0196661 | A1 | 8/2009 | Yoshida | |
| 2009/0232539 | A1 * | 9/2009 | Nozawa et al. | 399/101 |
| 2010/0017019 | A1 * | 1/2010 | Andoh et al. | 700/229 |
| 2010/0080589 | A1 * | 4/2010 | Yoshioka | 399/45 |
| 2010/0080631 | A1 * | 4/2010 | Ogiyama et al. | 399/308 |
| 2010/0098446 | A1 * | 4/2010 | Ishikawa et al. | 399/51 |
| 2010/0266300 | A1 | 10/2010 | Yoshida | |
| 2011/0103810 | A1 | 5/2011 | Yoshida | |
| 2011/0222920 | A1 * | 9/2011 | Kobayashi et al. | 399/299 |
| 2011/0249992 | A1 | 10/2011 | Yoshida | |
| 2012/0230706 | A1 * | 9/2012 | Yoshida | 399/27 |
| 2013/0077984 | A1 * | 3/2013 | Yoshida | 399/66 |

FOREIGN PATENT DOCUMENTS

| | | | | |
|---|---|---|---|---|
| JP | 2001-305823 | | 11/2001 | |
| JP | 2001-312154 | | 11/2001 | |
| JP | 2002-123052 | * | 4/2002 | G03G 15/00 |
| JP | 2006-308816 | | 11/2006 | |

* cited by examiner

IMAGE FORMING APPARATUS WITH MECHANISM CAPABLE OF MOVING TRANSFER DEVICE WITH RESPECT TO TONER IMAGE CARRIER AND IMAGE FORMING METHOD FOR MOVING TRANSFER DEVICE WITH RESPECT TO TONER IMAGE CARRIER

CROSS-REFERENCE TO RELATED APPLICATION

This patent application is based on and claims priority pursuant to 35 U.S.C. §119 to Japanese Patent Application No. 2011-212692, filed on Sep. 28, 2011, in the Japanese Patent Office, the entire disclosure of which is hereby incorporated by reference herein.

BACKGROUND OF THE INVENTION

1. Field of the Invention

Exemplary aspects of the present invention relate to an image forming apparatus and an image forming method, and more particularly, to an image forming apparatus for forming a toner image by transferring the toner image onto a recording medium directly or indirectly via an intermediate transferor and an image forming method employed by the image forming apparatus.

2. Description of the Related Art

Related-art image forming apparatuses, such as copiers, facsimile machines, printers, or multifunction printers having at least one of copying, printing, scanning, and facsimile functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a development device supplies toner to the electrostatic latent image formed on the photoconductor to render the electrostatic latent image visible as a toner image; the toner image is primarily transferred from the photoconductor onto an intermediate transfer belt and secondarily transferred from the intermediate transfer belt onto a recording medium; finally, a fixing device applies heat and pressure to the recording medium bearing the toner image to fix the toner image on the recording medium, thus forming the image on the recording medium.

In order to form a toner image having a desired toner density, a toner patch is formed on the photoconductor, which is transferred onto the intermediate transfer belt. An optical sensor disposed opposite the intermediate transfer belt detects the toner density of the toner patch based on which image forming conditions such as the toner density of the toner image, the charging bias, and the development bias are adjusted. For example, if the image forming apparatus receives a multiple print job for forming a toner image on a plurality of recording media, the toner patch is created in a gap between successive toner images formed on the intermediate transfer belt. The toner image primarily transferred from the photoconductor onto the intermediate transfer belt is secondarily transferred onto the recording medium conveyed through a secondary transfer region formed between the intermediate transfer belt and a secondary transfer device pressed against the intermediate transfer belt. Since the toner patch should not be transferred onto the recording medium, no recording medium is conveyed through the secondary transfer region as the toner patch passes through the secondary transfer region. Accordingly, the toner patch created on the intermediate transfer belt may contact the secondary transfer device as it is conveyed through the secondary transfer region due to absence of the recording medium and toner may move from the toner patch to the secondary transfer device. Hence, as a subsequent recording medium is conveyed through the secondary transfer region, the toner may further move from the secondary transfer device to the back side of the subsequent recording medium that contacts the secondary transfer device, staining the subsequent recording medium.

To address this problem, a sensor disposed upstream from the secondary transfer region in a recording medium conveyance direction may detect absence of a recording medium conveyed toward the secondary transfer region. Whenever the sensor detects such absence of the recording medium, the secondary transfer device separates from the intermediate transfer belt so that the toner patch created on the intermediate transfer belt does not come into contact with the secondary transfer device as it is conveyed through the secondary transfer region, thus preventing adhesion of toner of the toner patch to the secondary transfer device.

However, since the secondary transfer device separates from the intermediate transfer belt whenever the sensor detects absence of the recording medium, the secondary transfer device comes into contact with and separates from the intermediate transfer belt repeatedly during the multiple print job for forming the toner image on the plurality of recording media. Since it takes time to bring the secondary transfer device into contact with and isolation from the intermediate transfer belt, an increased time may be consumed to finish the multiple print job, degrading productivity of the image forming apparatus.

To address this problem, the secondary transfer device may move with respect to the intermediate transfer belt at an increased speed. However, the secondary transfer device moving at the increased speed may vibrate the intermediate transfer belt, degrading the toner image formed on the intermediate transfer belt.

SUMMARY OF THE INVENTION

This specification describes below an improved image forming apparatus. In one exemplary embodiment of the present invention, the image forming apparatus includes a toner image carrier rotatable in a predetermined direction of rotation and carrying at least three, first to third toner images created successively thereon in the direction of rotation thereof to be transferred onto at least three successive recording media, respectively, as a print job, a toner patch section disposed between the first toner image and the second toner image and carrying a toner patch, and a blank section interposed between the second toner image and the third toner image. A transfer device separatably contacts the toner image carrier to form a transfer region therebetween through which the recording media are conveyed. A transfer device separator contacts and moves the transfer device between a contact position and a first isolation position within a shortened time, the contact position where the transfer device contacts the toner image carrier and the first isolation position where the transfer device is isolated from the toner image carrier with a first interval therebetween. A controller is operatively connected to the transfer device separator to control the transfer device separator to move the transfer device to the contact position as the first to third toner images and the blank section of the toner image carrier pass through the transfer region and to the first isolation position as the toner patch section of the toner image carrier passes through the transfer region.

This specification further describes an improved image forming method. In one exemplary embodiment of the present invention, the image forming method includes receiving a print job of forming at least three, first to third toner images on at least three, first to third recording media, respectively; bringing a transfer device into contact with a toner image carrier; forming the first toner image on the toner image carrier; forming a toner patch on the toner image carrier; transferring the first toner image formed on the toner image carrier onto the first recording medium conveyed through a transfer region formed between the transfer device and the toner image carrier; determining that a trailing edge of the first recording medium has passed through the transfer region; isolating the transfer device from the toner image carrier within a shortened time with an interval therebetween; determining that a trailing edge of the toner patch formed on the toner image carrier has passed through the transfer region; bringing the transfer device into contact with the toner image carrier; and transferring the second and third toner images from the toner image carrier onto the second and third recording media, respectively, conveyed through the transfer region.

BRIEF DESCRIPTION OF THE DRAWINGS

A more complete appreciation of the invention and the many attendant advantages thereof will be readily obtained as the same becomes better understood by reference to the following detailed description when considered in connection with the accompanying drawings, wherein.

DETAILED DESCRIPTION OF THE INVENTION

Figure 1:
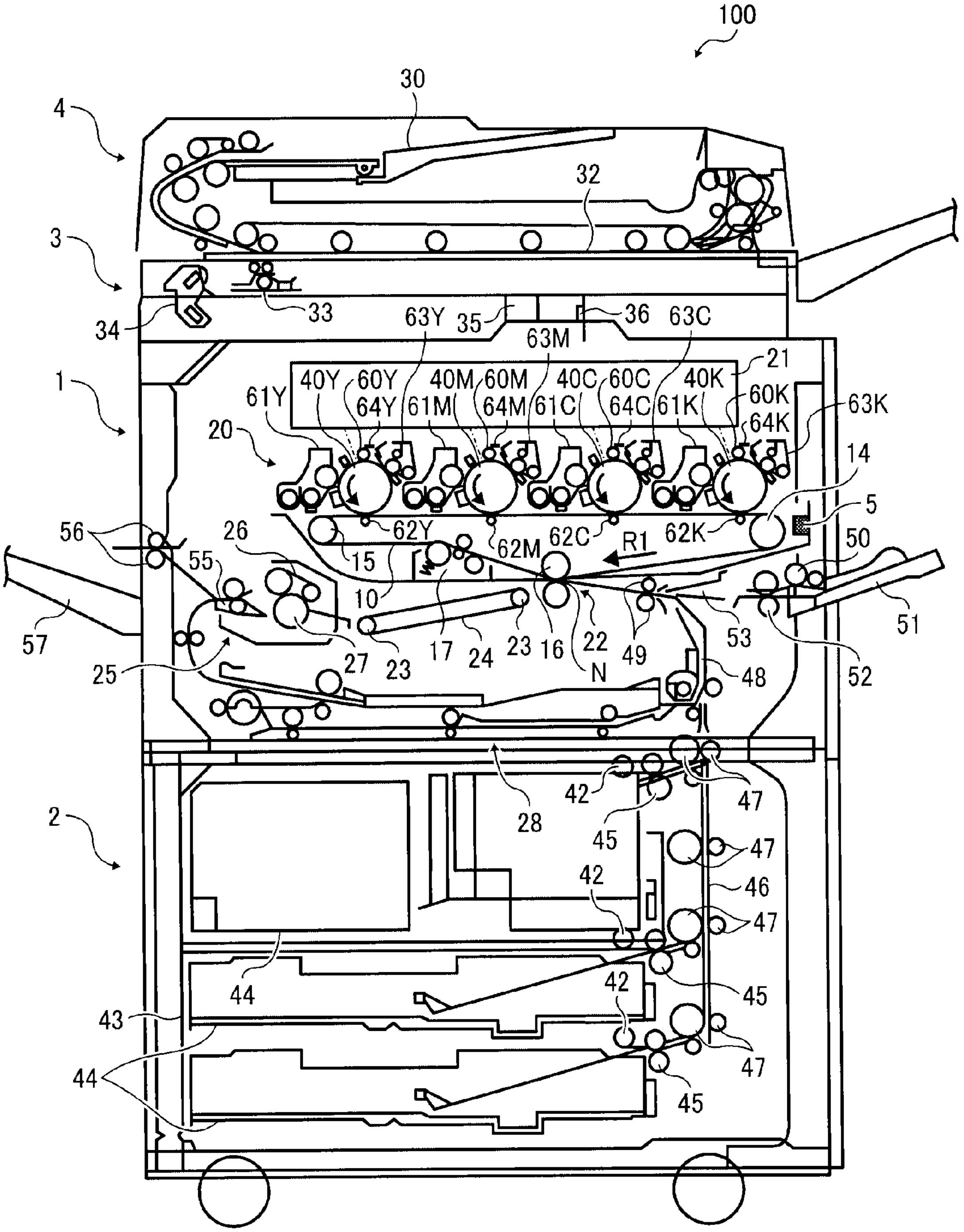
FIG. 1 is a schematic vertical sectional view of an image forming apparatus according to an exemplary embodiment of the present invention.

In describing exemplary embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views, in particular to FIG. 1, an image forming apparatus 100 according to an exemplary embodiment of the present invention is explained.

FIG. 1 is a schematic vertical sectional view of the image forming apparatus 100. The image forming apparatus 100 may be a copier, a facsimile machine, a printer, a multifunction printer having at least one of copying, printing, scanning, plotter, and facsimile functions, or the like. According to this exemplary embodiment, the image forming apparatus 100 is a tandem color copier for forming a color toner image on a recording medium by electrophotography. The image forming apparatus 100 employs an intermediate transfer method using an intermediate transfer belt 10 serving as a toner image carrier that carries a toner image to be transferred onto a recording medium. The image forming apparatus 100 is constructed of a paper storage 2 disposed in a lower portion thereof, a body 1 disposed above the paper storage 2, a scanner 3 disposed above the body 1, and an auto document feeder (ADF) 4 disposed above the scanner 3.

The body 1 includes a transfer unit 20 in substantially a center portion thereof. The transfer unit 20 incorporates the endless intermediate transfer belt 10 stretched over a driving roller 14 and support rollers 15 and 16. As the driving roller 14 drives and rotates the intermediate transfer belt 10 clockwise in FIG. 1 in a rotation direction R1, the support rollers 15 and 16 are driven and rotated in accordance with rotation of the intermediate transfer belt 10 by friction therebetween. Downstream from the support roller 16 in the rotation direction R1 of the intermediate transfer belt 10 is a belt cleaner 17 that removes residual toner remaining on an outer circumferential surface of the intermediate transfer belt 10 after a toner image is transferred from the intermediate transfer belt 10 onto a recording medium as described below, thus rendering the intermediate transfer belt 10 to be ready for the next transfer operation.

Above the intermediate transfer belt 10 are four drum-shaped photoconductors 40Y, 40M, 40C, and 40K arranged along the rotation direction R1 of the intermediate transfer belt 10. The photoconductors 40Y, 40M, 40C, and 40K serve as electrostatic latent image carriers that carry electrostatic latent images and resultant yellow, magenta, cyan, and black toner images, respectively. The photoconductors 40Y, 40M, 40C, and 40K are rotatable counterclockwise in FIG. 1 and surrounded by chargers 60Y, 60M, 60C, and 60K, development devices 61Y, 61M, 61C, and 61K, primary transfer devices 62Y, 62M, 62C, and 62K, photoconductor cleaners 63Y, 63M, 63C, and 63K, and dischargers 64Y, 64M, 64C, and 64K, respectively. Above the photoconductors 40Y, 40M, 40C, and 40K is an exposure device 21.

Below the intermediate transfer belt 10 is a secondary transfer device 22 serving as a transfer device or a secondary transferor. The secondary transfer device 22 is pressed against the support roller 16 via the intermediate transfer belt 10 to form a secondary transfer region N between the secondary transfer device 22 and the intermediate transfer belt 10. As a recording medium is conveyed through the secondary transfer region N, the secondary transfer device 22 secondarily transfers the yellow, magenta, cyan, and black toner images formed on the intermediate transfer belt 10 onto the recording medium collectively, thus forming a color toner image on the recording medium.

Downstream from the secondary transfer device 22 in a recording medium conveyance direction is an endless conveyance belt 24 looped over a pair of rollers 23 that conveys the recording medium bearing the color toner image toward a fixing device 25 disposed downstream from the conveyance belt 24 in the recording medium conveyance direction. The fixing device 25 includes an endless fixing belt 26 and a pressing roller 27 pressed against the fixing belt 26 to form a fixing nip therebetween through which the recording medium is conveyed. As the recording medium is conveyed through the fixing nip, the fixing belt 26 and the pressing roller 27 apply heat and pressure to the recording medium, melting and fixing the color toner image on the recording medium. Below the secondary transfer device 22 is a reverse device 28 that reverses the recording medium conveyed from the fixing device 25 for duplex printing.

The following describes a copying operation of the image forming apparatus 100 having the structure described above to form a color toner image on a recording medium.

As a user places an original document on an original document tray 30 of the ADF 4 and presses a start button on a control panel disposed atop the body 1, conveyance rollers of the ADF 4 automatically convey the original document onto an exposure glass 32 of the scanner 3 and the scanner 3 starts scanning the original document. Alternatively, as the user lifts the ADF 4, places an original document on the exposure glass 32 manually, lowers the ADF 4 to press the original document against the exposure glass 32, and presses the start button on the control panel, the scanner 3 starts scanning the original document. For example, as a first carriage 33 and a second carriage 34 of the scanner 3 move, a light source mounted on the first carriage 33 emits light onto the original document placed on the exposure glass 32. A mirror mounted on the first carriage 33 deflects light reflected by the original document toward the second carriage 34. A pair of mirrors mounted on the second carriage 34 deflects light by about 180 degrees toward a reading sensor 36 through an image forming lens 35 so that the reading sensor 36 reads an image on the original document into image data.

On the other hand, as the user presses the start button on the control panel, the intermediate transfer belt 10 starts rotating clockwise in FIG. 1 in the rotation direction R1 and at the same time the photoconductors 40Y, 40M, 40C, and 40K start rotating counterclockwise in FIG. 1. As the photoconductors 40Y, 40M, 40C, and 40K rotate, the chargers 60Y, 60M, 60C, and 60K uniformly charge the photoconductors 40Y, 40M, 40C, and 40K; the exposure device 3 emits laser beams onto the charged photoconductors 40Y, 40M, 40C, and 40K according to image data sent from the scanner 3, thus forming electrostatic latent images thereon; and the development devices 61Y, 61M, 61C, and 61K develop the electrostatic latent images into yellow, magenta, cyan, and black toner images, respectively. Thereafter, the primary transfer devices 62Y, 62M, 62C, and 62K primarily transfer the yellow, magenta, cyan, and black toner images formed on the photoconductors 40Y, 40M, 40C, and 40K, respectively, onto the intermediate transfer belt 10 successively as the intermediate transfer belt 10 rotates in the rotation direction R1 so that the yellow, magenta, cyan, and black toner images are superimposed on a same position on the intermediate transfer belt 10, thus forming a color toner image thereon.

On the other hand, one of a plurality of paper trays 44 situated inside a paper bank 43 of the paper storage 2 is selected according to a print job input by the user using the control panel. Accordingly, a pickup roller 42 corresponding to the selected paper tray 44 picks up and feeds an uppermost recording medium from a plurality of recording media loaded on the paper tray 44. A separation roller 45 separates the uppermost recording medium from other recording media and feeds the separated recording medium toward a conveyance path 46. Conveyance roller pairs 47 convey the recording medium through the conveyance path 46 toward a conveyance path 48 situated inside the body 1. As the recording medium comes into contact with a registration roller pair 49, the registration roller pair 49 halts the recording medium temporarily. Alternatively, if the user places a plurality of recording media onto a bypass tray 51, a rotating pickup roller 50 picks up and feeds an uppermost recording medium toward a separation roller 52. The separation roller 52 separates the uppermost recording medium from other recording media and conveys the separated recording medium toward a conveyance path 53. As the recording medium comes into contact with the registration roller pair 49, the registration roller pair 49 halts the recording medium temporarily.

Whether the recording medium is sent from the paper tray 44 or the bypass tray 51, the registration roller pair 49 resumes rotating at a time when the color toner image formed on the intermediate transfer belt 10 is transferred onto the recording medium conveyed through the secondary transfer region N formed between the intermediate transfer belt 10 and the secondary transfer device 22. Thereafter, the conveyance belt 24 conveys the recording medium bearing the color toner image to the fixing device 25 where the fixing belt 26 and the pressing roller 27 apply heat and pressure to the recording medium, fixing the color toner image on the recording medium. Then, a switch pawl 55 guides the recording medium toward an output roller pair 56 that discharges the recording medium onto an output tray 57 where the recording media bearing the fixed toner image are stacked.

If the user selects duplex printing, the switch pawl 55 guides the recording medium bearing the color toner image on a front side thereof toward the reverse device 28 that reverses and feeds the recording medium toward the secondary transfer region N formed between the secondary transfer device 22 and the intermediate transfer belt 10. As the recording medium is conveyed through the secondary transfer region N, another toner image is transferred from the intermediate transfer belt 10 onto a back side of the recording medium. After the recording medium is conveyed through the fixing device 25, the switch pawl 55 guides the recording medium toward the output roller pair 56 that discharges the recording medium onto the output tray 57. If the user selects monochrome printing, the support rollers 15 and 16 move to isolate the intermediate transfer belt 10 from the photoconductors 40Y, 40M, and 40C so that only the photoconductor 40K contacts the intermediate transfer belt 10 to allow the primary transfer device 62K to transfer the black toner image formed on the photoconductor 40K onto the intermediate transfer belt 10. If the image forming apparatus 100 is a single drum image forming apparatus that incorporates a single photoconductor instead of a tandem image forming apparatus that incorporates the four photoconductors 40Y, 40M, 40C, and 40K shown in FIG. 1, the image forming apparatus 100 forms a black toner image first to shorten a first print time required to output a recording medium bearing a toner image onto the output tray 57 after the image forming apparatus 100 receives a print job. Then, the image forming apparatus 100 forms yellow, magenta, and cyan toner images for a color print job.

Generally, the registration roller pair 49 is grounded. However, the registration roller pair 49 may be applied with a bias to remove paper dust produced from the recording medium. For example, if a conductive rubber roller having a diameter of about 18 mm and a surface layer coated with a conductive nitrile-butadiene rubber (NBR) having a thickness of about 1 mm is used as the registration roller pair 49 applied with a bias, since the conductive NBR has a volume resistivity of about $10^9$ Ω·cm, the rubber roller contacting the front side of the recording medium bearing the toner image is applied with a voltage of about −800 V and the rubber roller contacting the back side of the recording medium not bearing the toner image is applied with a voltage of about +200 V. In the image forming apparatus 100 incorporating the intermediate transfer belt 10, paper dust produced from the recording medium does not generally move to the photoconductors 40Y, 40M, 40C, and 40K. Accordingly, it is not necessary to take measures against paper dust that may be transferred onto the toner image. Consequently, the registration roller pair 49 can be grounded.

Further, the registration roller pair 49 is generally applied with a direct current bias. Alternatively, the registration roller pair 49 may be applied with an alternating current voltage having a direct current offset component to uniformly charge the recording medium. Accordingly, after the recording medium passes through the registration roller pair 49, the front side of the recording medium is negatively charged slightly. To address this circumstance, it may be necessary to set a secondary transfer condition different from that for the registration roller pair 49 applied with no voltage to secondarily transfer the color toner image from the intermediate transfer belt 10 onto the recording medium.

Figure 2:
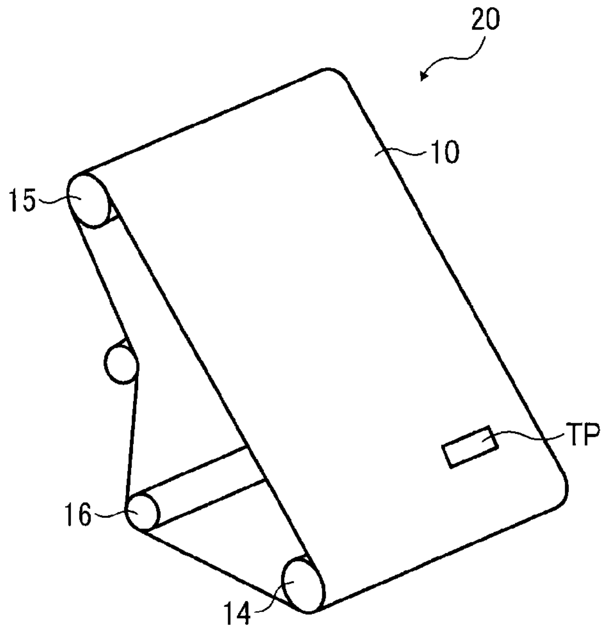
FIG. 2 is a perspective view of a transfer unit incorporated in the image forming apparatus shown in FIG. 1.

Referring to FIGS. 1 and 2, the following describes a toner sensor 5 disposed opposite the driving roller 14 via the intermediate transfer belt 10.

As shown in FIG. 1, the toner sensor 5 is disposed opposite the outer circumferential surface of the intermediate transfer belt 10 and serves as a toner detector that detects an amount of toner, that is, a density of toner, adhered to the outer circumferential surface of the intermediate transfer belt 10. The toner sensor 5 is constructed of an infrared-emitting diode used as a light emitting portion and a photodiode used as a diffuse reflection light receiving portion. The toner sensor 5 outputs voltage according to an amount of light received.

FIG. 2 is a perspective view of the transfer unit 20. As shown in FIG. 2, a toner patch TP is created on the outer circumferential surface of the intermediate transfer belt 10 to adjust the density of toner adhered to the intermediate transfer belt 10. Initially, a toner patch TP is formed on the respective photoconductors 40Y, 40M, 40C, and 40K and transferred onto the intermediate transfer belt 10 by the respective primary transfer devices 62Y, 62M, 62C, and 62K as the toner patch TP passes through a primary transfer nip formed between the respective photoconductors 40Y, 40M, 40C, and 40K and the intermediate transfer belt 10. Thus, the toner patch TP adheres to the intermediate transfer belt 10. Generally, a plurality of toner patches TP having different target densities is created for a plurality of colors of yellow, magenta, cyan, and black. The toner sensor 5 disposed opposite the intermediate transfer belt 10 detects the amount of toner, that is, the density of toner, of each toner patch TP. For example, the toner sensor 5 detects the amount of toner of the toner patch TP in a process control mode, that is, a toner density adjustment mode, different from the image forming operation described above or during the image forming operation of forming a toner image on a plurality of recording media continuously by using a gap between successive toner images, that is, between successive recording media, on the intermediate transfer belt 10.

Figure 3:
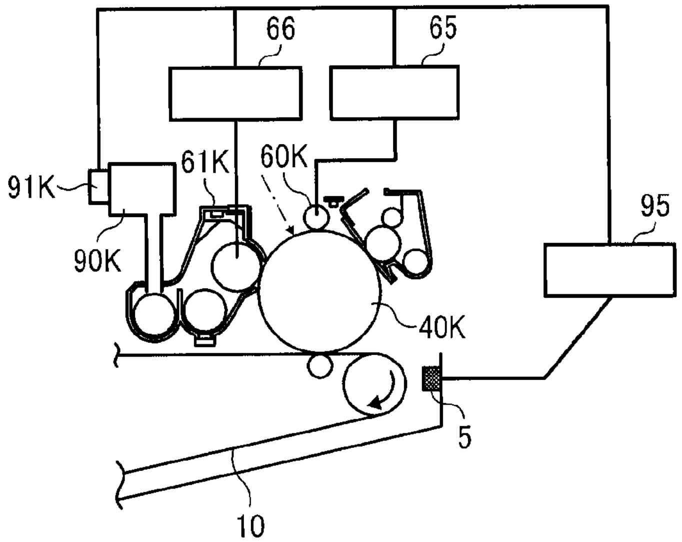
FIG. 3 is a partially enlarged vertical sectional view of a photoconductor and a toner density adjuster incorporated in the image forming apparatus shown in FIG. 1.

Referring to FIG. 3, a description is now given of adjustment of image density, also referred to as a toner density, for a black toner image, as a representative example of the adjustment of image density.

Although not illustrated, the density of toner for cyan, magenta, and yellow is adjusted in the same manner. FIG. 3 is a partially enlarged vertical sectional view of the photoconductor 40K and a toner density adjuster 95.

As shown in FIG. 3, a charging bias applicator 65 is connected to the charger 60K; a development bias applicator 66 is connected to the development device 61K; a toner supply unit 90K incorporating a toner supply motor 91K is connected to the development device 61K. The toner density adjuster 95 is operatively connected to the charging bias applicator 65, the development bias applicator 66, and the toner supply motor 91K of the toner supply unit 90K.

The toner sensor 5 detects an amount of toner of the toner batch TP formed on the intermediate transfer belt 10. Based on the result detected by the toner sensor 5, the toner density adjuster 95 controls at least one of the charging bias applicator 65, the development bias applicator 66, and the toner supply motor 91K of the toner supply unit 90K to adjust the toner density of a toner image to be formed on the photoconductor 40K. For example, when adjusting the density of the toner image using the charging bias applicator 65, the toner density adjuster 95 controls the charging bias applicator 65 to adjust an amount of charging bias applied to the photoconductor 40K. When adjusting the density of the toner image using the toner supply motor 91K, the toner density adjuster 95 controls the toner supply motor 91K to adjust an amount of toner supplied to the development device 61K. When adjusting the density of the toner image using the development bias applicator 66, the toner density adjuster 95 controls the development bias applicator 66 to adjust an amount of development bias applied to the photoconductor 40K.

Figure 4A:
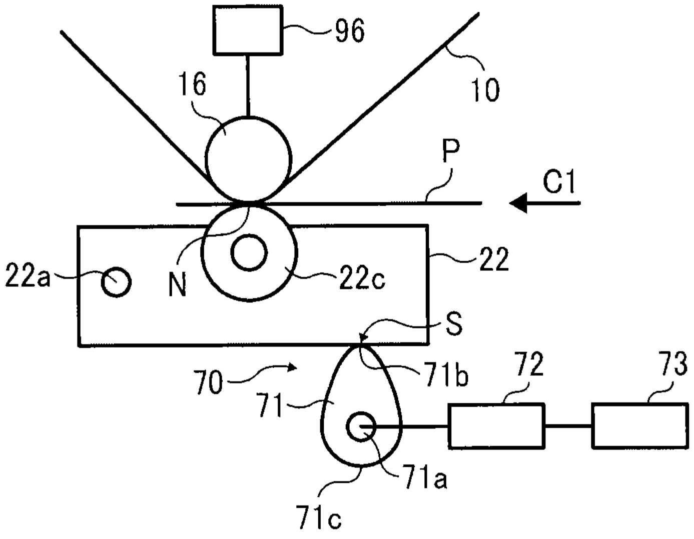
FIG. 4A is a vertical sectional view of an intermediate transfer belt, a secondary transfer device, and a secondary transfer device separator according to a first exemplary embodiment incorporated in the image forming apparatus shown in FIG. 1 in a state in which the secondary transfer device contacts the intermediate transfer belt.
Figure 4B:
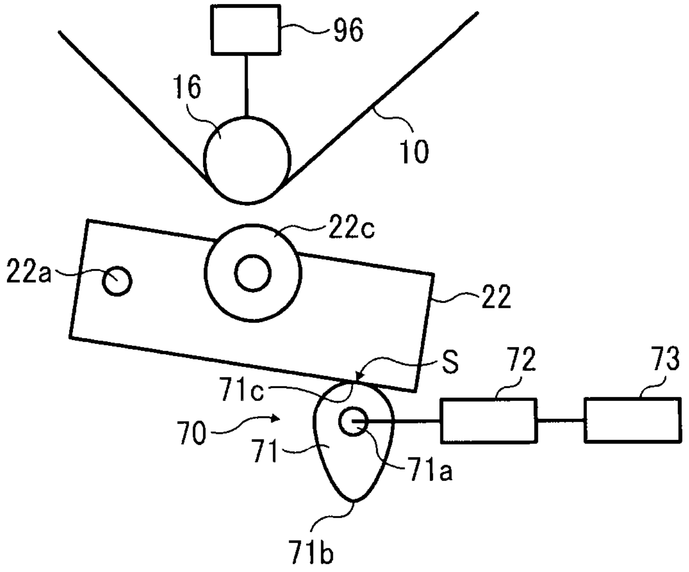
FIG. 4B is a vertical sectional view of the intermediate transfer belt, the secondary transfer device, and the secondary transfer device separator shown in FIG. 4A in a state in which the secondary transfer device is isolated from the intermediate transfer belt.

Referring to FIGS. 4A and 4B, the following describes a configuration of a secondary transfer device separator 70 incorporated in the image forming apparatus 100 depicted in FIG. 1 according to a first exemplary embodiment.

The secondary transfer device separator 70 moves the secondary transfer device 22 with respect to the intermediate transfer belt 10.

A detailed description is now given of a construction and an operation of the secondary transfer device separator 70.

FIG. 4A is a vertical sectional view of the intermediate transfer belt 10, the secondary transfer device 22, and the secondary transfer device separator 70 that brings the secondary transfer device 22 into contact with the intermediate transfer belt 10 at a contact position. FIG. 4B is a vertical sectional view of the intermediate transfer belt 10, the secondary transfer device 22, and the secondary transfer device separator 70 that isolates the secondary transfer device 22 from the intermediate transfer belt 10 at an isolation position.

As shown in FIGS. 4A and 4B, the secondary transfer device separator 70 includes a cam 71 having an outer circumferential face that contacts a contact point S of the secondary transfer device 22; a rotation shaft 71*a* supporting the cam 71; and a driver 72 (e.g., a motor) connected to and rotating the rotation shaft 71*a*. The driver 72 is operatively connected to a controller 73, that is, a central processing unit (CPU), provided with a random-access memory (RAM) and a read-only memory (ROM), for example. As the controller 73 drives the driver 72, the driver 72 rotates the rotation shaft 71*a*, thus rotating the cam 71. As a farthest face 71*b* of the cam 71 farthest from the rotation shaft 71*a* comes into contact with the contact point S of the secondary transfer device 22, a secondary transfer roller 22*c* of the secondary transfer device 22 comes into contact with the intermediate transfer belt 10 at the contact position shown in FIG. 4A. Conversely, as the cam 71 rotates from the contact position shown in FIG. 4A by 180 degrees and thereby a closest face 71*c* of the cam 71 closest to the rotation shaft 71*a* comes into contact with the contact point S of the secondary transfer device 22, the secondary transfer roller 22*c* of the secondary transfer device 22 is isolated from the intermediate transfer belt 10 at the isolation position shown in FIG. 4B.

As the cam 71 rotates from the contact position shown in FIG. 4A to the isolation position shown in FIG. 4B, the secondary transfer device 22 keeps in contact with the outer circumferential face of the cam 71 by its weight. Accordingly, as the cam 71 rotates from the contact position shown in FIG. 4A to the isolation position shown in FIG. 4B, the secondary transfer device 22 rotates about a rotation shaft 22*a* clockwise in FIG. 4A from the contact position shown in FIG. 4A to the isolation position shown in FIG. 4B.

Figure 5:
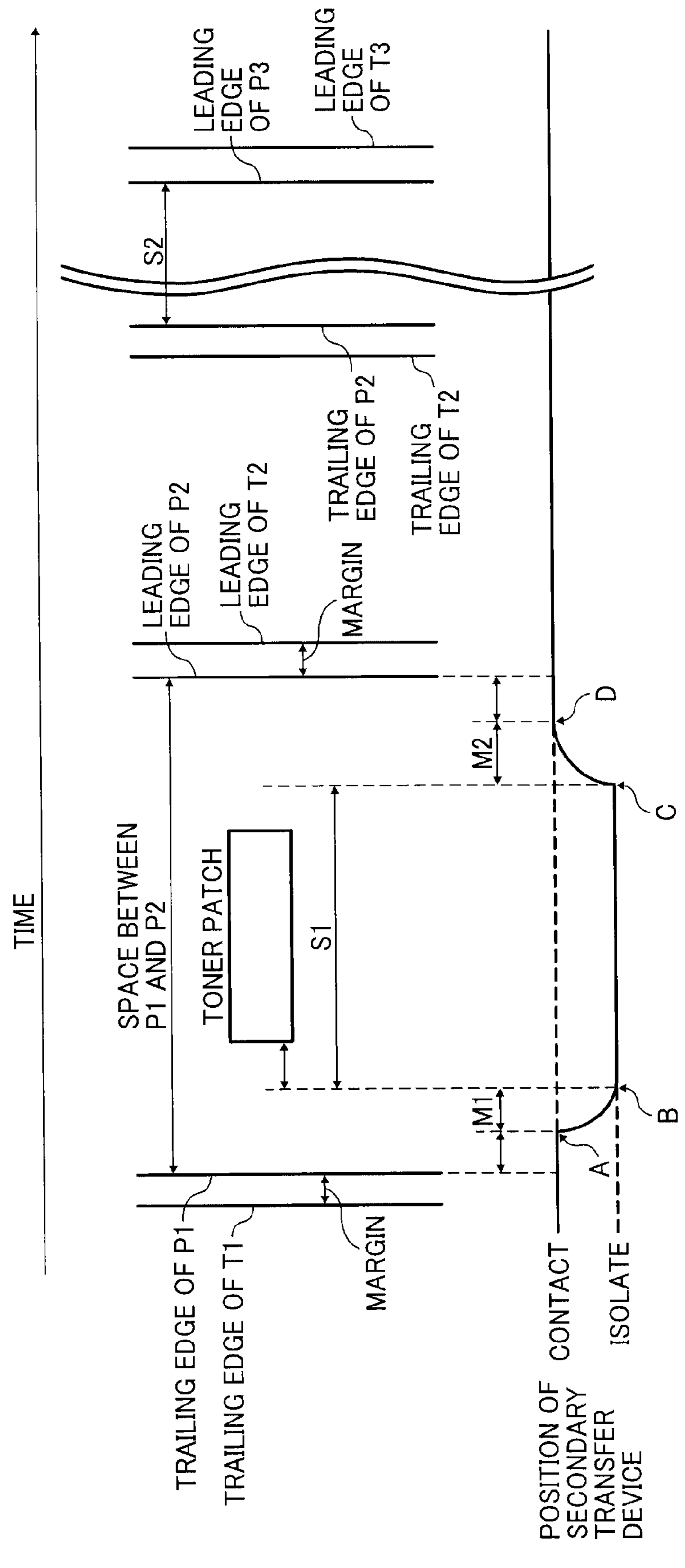
FIG. 5 is a diagram illustrating a control method according to the first exemplary embodiment.

Referring to FIG. 5, the following describes a control method for moving the secondary transfer device 22 with respect to the intermediate transfer belt 10.

FIG. 5 is a diagram illustrating a time when first to third recording media P1 to P3 bearing first to third toner images T1 to T3, respectively, and the toner patch TP formed on the intermediate transfer belt 10 pass through the secondary transfer region N and a time when the secondary transfer device 22 comes into contact with and isolation from the intermediate transfer belt 10. According to the first exemplary embodiment, during a print job for forming a toner image on a plurality of recording media continuously (hereinafter referred to as a multiple print job), a toner patch TP is formed at a predetermined time in a gap between the successive toner images, that is, between the first toner image T1 and the second toner image T2, on the intermediate transfer belt 10. The toner sensor 5 depicted in FIG. 1 detects the toner patch TP, performing process control, that is, toner density adjustment. As the toner patch TP formed on the intermediate transfer belt 10 passes through the secondary transfer region N, no recording medium is conveyed through the secondary transfer region N. Hence, if the secondary transfer device 22 contacts the intermediate transfer belt 10 while the toner patch TP passes through the secondary transfer region N, the toner patch TP comes into contact with and adheres to the secondary transfer device 22. If the adhered toner patch TP is transferred from the secondary transfer device 22 onto a recording medium coming into the secondary transfer region N, the toner patch TP adheres to and stains the back side of the recording medium.

To address this problem, the controller 73 controls the driver 72 to rotate the cam 71 as shown in FIG. 5. Thus, while the toner patch TP, that is, toner not to be transferred onto a recording medium, passes through the secondary transfer region N, the cam 71 isolates the secondary transfer device 22 from the intermediate transfer belt 10 at the isolation position shown in FIG. 4B.

For example, in a state in which the secondary transfer device 22 contacts the intermediate transfer belt 10 at the contact position shown in FIG. 4A, immediately before a toner patch TP is formed on the intermediate transfer belt 10, the first toner image T1 formed on the intermediate transfer belt 10 is secondarily transferred onto the first recording medium P1 conveyed through the secondary transfer region N. After a trailing edge of the first recording medium P1 passes through the secondary transfer region N, the controller 73 controls the driver 72 to start rotating the cam 71 at a time A shown in FIG. 5. Specifically, the controller 73 determines the time A to start rotating the cam 71 so that half-turn of the cam 71 is completed and therefore the secondary transfer device 22 is isolated from the intermediate transfer belt 10 at the isolation position shown in FIG. 4B at a time B shown in FIG. 5 before a leading edge of the toner patch TP enters the secondary transfer region N. That is, the cam 71 moves from the contact position shown in FIG. 4A to the isolation position shown in FIG. 4B within a shortened time M1, thus isolating the secondary transfer device 22 from the intermediate transfer belt 10 quickly.

After a trailing edge of the toner patch TP passes through the secondary transfer region N, the controller 73 controls the driver 72 to start rotating the cam 71 at a time C shown in FIG. 5. Specifically, the controller 73 determines the time C to start rotating the cam 71 so that half-turn of the cam 71 is completed and therefore the secondary transfer device 22 comes into contact with the intermediate transfer belt 10 at the contact position shown in FIG. 4A at a time D shown in FIG. 5 before a leading edge of the second recording medium P2 enters the secondary transfer region N. That is, the cam 71 moves from the isolation position shown in FIG. 4B to the contact position shown in FIG. 4A within a shortened time M2, bringing the secondary transfer device 22 into contact with the intermediate transfer belt 10.

Accordingly, while a toner patch section S1 on the intermediate transfer belt 10 defined as an interval between the time B and the time C passes through the secondary transfer region N, the secondary transfer device 22 is isolated from the intermediate transfer belt 10. After the time D, the secondary transfer device 22 remains in contact with the intermediate transfer belt 10 while the second recording medium P2, a blank section S2 on the intermediate transfer belt 10 without the toner patch TP interposed between the second recording medium P2 and the third recording medium P3, and the third recording medium P3 are conveyed through the secondary transfer region N.

Figure 6A:
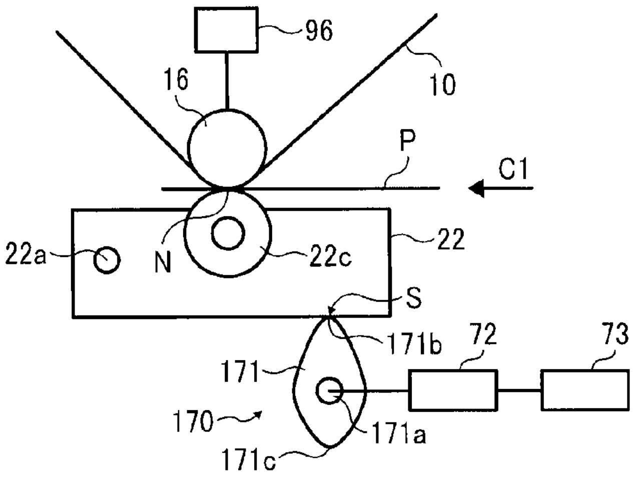
FIG. 6A is a vertical sectional view of the intermediate transfer belt, the secondary transfer device, and a secondary transfer device separator according to a second exemplary embodiment incorporated in the image forming apparatus shown in FIG. 1 in a state in which the secondary transfer device contacts the intermediate transfer belt.
Figure 6B:
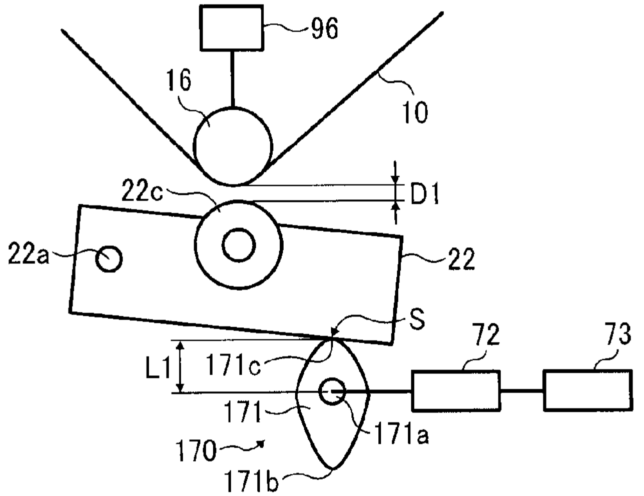
FIG. 6B is a vertical sectional view of the intermediate transfer belt, the secondary transfer device, and the secondary transfer device separator shown in FIG. 6A in a state in which the secondary transfer device is isolated from the intermediate transfer belt at a first isolation position.
Figure 6C:
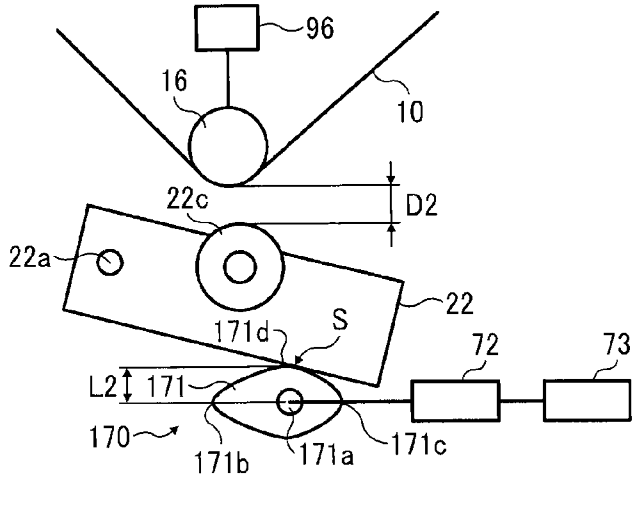
FIG. 6C is a vertical sectional view of the intermediate transfer belt, the secondary transfer device, and the secondary transfer device separator shown in FIG. 6A in a state in which the secondary transfer device is isolated from the intermediate transfer belt at a second isolation position.

Referring to FIGS. 6A, 6B, and 6C, the following describes a configuration of a secondary transfer device separator 170 incorporated in the image forming apparatus 100 depicted in FIG. 1 according to a second exemplary embodiment.

The secondary transfer device separator 170 moves the secondary transfer device 22 with respect to the intermediate transfer belt 10.

A detailed description is now given of a construction and an operation of the secondary transfer device separator 170.

FIG. 6A is a vertical sectional view of the intermediate transfer belt 10, the secondary transfer device 22, and the secondary transfer device separator 170 that brings the secondary transfer device 22 into contact with the intermediate transfer belt 10 at a contact position. FIG. 6B is a vertical sectional view of the intermediate transfer belt 10, the secondary transfer device 22, and the secondary transfer device separator 170 that isolates the secondary transfer device 22 from the intermediate transfer belt 10 at a first isolation position. FIG. 6C is a vertical sectional view of the intermediate transfer belt 10, the secondary transfer device 22, and the secondary transfer device separator 170 that isolates the secondary transfer device 22 from the intermediate transfer belt 10 at a second isolation position.

As shown in FIGS. 6A to 6C, the secondary transfer device separator 170 includes a cam 171 having an outer circumferential face that contacts the contact point S of the secondary transfer device 22; a rotation shaft 171*a* supporting the cam 171; and the driver 72 (e.g., a motor) connected to and rotating the rotation shaft 171*a*. The driver 72 is operatively connected to the controller 73. As the controller 73 drives the driver 72, the driver 72 rotates the rotation shaft 171*a*, thus rotating the cam 171. Like the secondary transfer device separator 70 depicted in FIGS. 4A and 4B, the secondary transfer device separator 170 includes the cam 171 that rotates and moves the secondary transfer device 22 with respect to the intermediate transfer belt 10. However, unlike the secondary transfer device separator 70, the secondary transfer device separator 170 isolates the secondary transfer device 22 from the intermediate transfer belt 10 at two positions, that is, the first isolation position shown in FIG. 6B where the secondary transfer device 22 is spaced apart from the intermediate transfer belt 10 with a first interval D1 therebetween and the second isolation position shown in FIG. 6C where the secondary transfer device 22 is spaced apart from the intermediate transfer belt 10 with a second interval D2 therebetween. For example, as a farthest face 171*b* of the cam 171 farthest from the rotation shaft 171*a* comes into contact with the contact point S of the secondary transfer device 22, the secondary transfer roller 22*c* of the secondary transfer device 22 comes into contact with the intermediate transfer belt 10 at the contact position shown in FIG. 6A.

Conversely, as the cam 171 rotates clockwise or counterclockwise in FIG. 6A by 180 degrees from the contact position shown in FIG. 6A and thereby a closer face 171*c* of the cam 171 closer to the rotation shaft 171*a* than the farthest face 171*b* comes into contact with the contact point S of the secondary transfer device 22, the secondary transfer roller 22*c* of the secondary transfer device 22 is isolated from the intermediate transfer belt 10 at the first isolation position shown in FIG. 6B where the secondary transfer device 22 is spaced apart from the intermediate transfer belt 10 with the first interval D1 therebetween. As the cam 171 rotates counterclockwise in FIG. 6A by 90 degrees from the contact position shown in FIG. 6A and thereby a closest face 171*d* of the cam 171 closest to the rotation shaft 171*a* comes into contact with the contact point S of the secondary transfer device 22, the secondary transfer roller 22*c* of the secondary transfer device 22 is isolated from the intermediate transfer belt 10 at the second isolation position shown in FIG. 6C where the secondary transfer device 22 is spaced apart from the intermediate transfer belt 10 with the second interval D2 greater than the first interval D1 therebetween. A length L1 from the rotation shaft 171*a* to the closer face 171*c* shown in FIG. 6B is greater than a length L2 from the rotation shaft 171*a* to the closest face 171*d* shown in FIG. 6C. Hence, the first interval D1 between the secondary transfer device 22 and the intermediate transfer belt 10 produced when the closer face 171*c* of the cam 171 contacts the contact point S of the secondary transfer device 22 is smaller than the second interval D2 between the secondary transfer device 22 and the intermediate transfer belt 10 produced when the closest face 171*d* of the cam 171 contacts the contact point S of the secondary transfer device 22.

Since the cam 171 is rotatable clockwise and counterclockwise in FIG. 6A, the cam 171 moves the secondary transfer device 22 from any one of the contact position shown in FIG. 6A, the first isolation position shown in FIG. 6B, and the second isolation position shown in FIG. 6C to any other one of them. According to the second exemplary embodiment, the cam 171 is shaped to have the farthest face 171*b*, the closer face 171*c*, and the closest face 171*d*. Accordingly, the cam 171 rotates clockwise or counterclockwise by 180 degrees from the contact position shown in FIG. 6A where the farthest face 171*b* contacts the secondary transfer device 22, thus moving to the first isolation position shown in FIG. 6B where the closer face 171*c* contacts the secondary transfer device 22. Further, the cam 171 rotates clockwise or counterclockwise by 90 degrees from the contact position shown in FIG. 6A or the first isolation position shown in FIG. 6B, thus moving to the second isolation position shown in FIG. 6C where the closest face 171*d* contacts the secondary transfer device 22. Alternatively, the cam 171 may be shaped otherwise.

Figure 7A:
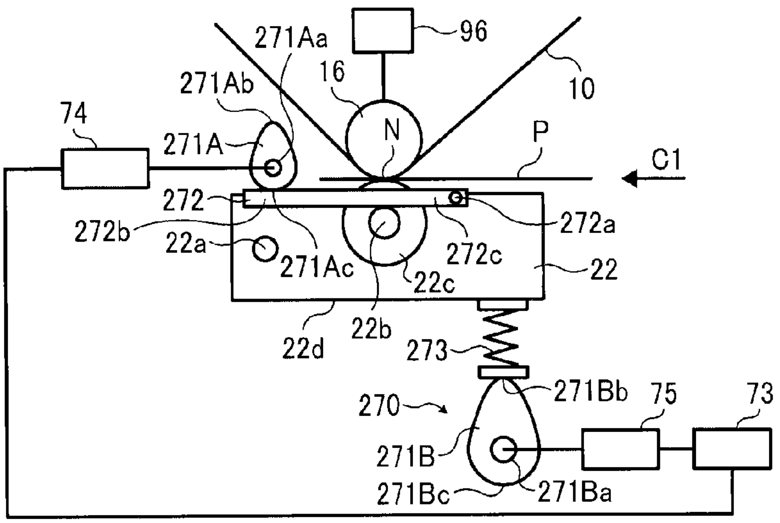
FIG. 7A is a vertical sectional view of the intermediate transfer belt, the secondary transfer device, and a secondary transfer device separator according to a third exemplary embodiment incorporated in the image forming apparatus shown in FIG. 1 in a state in which the secondary transfer device contacts the intermediate transfer belt.
Figure 7B:
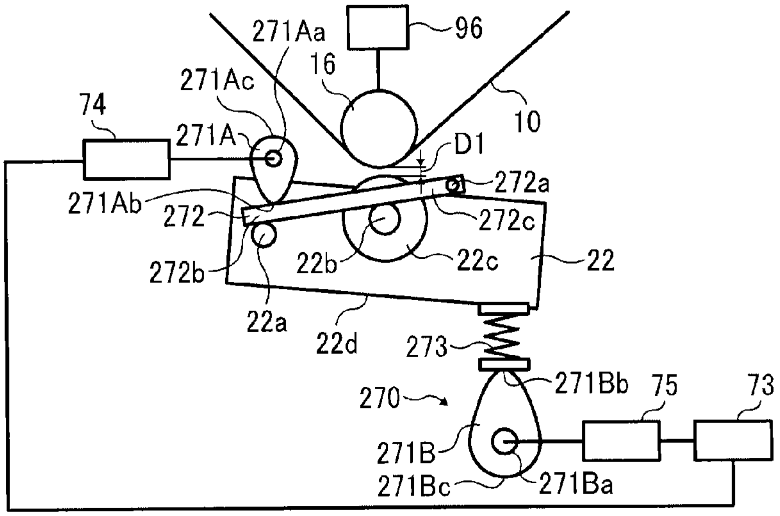
FIG. 7B is a vertical sectional view of the intermediate transfer belt, the secondary transfer device, and the secondary transfer device separator shown in FIG. 7A in a state in which the secondary transfer device is isolated from the intermediate transfer belt at a first isolation position.
Figure 7C:
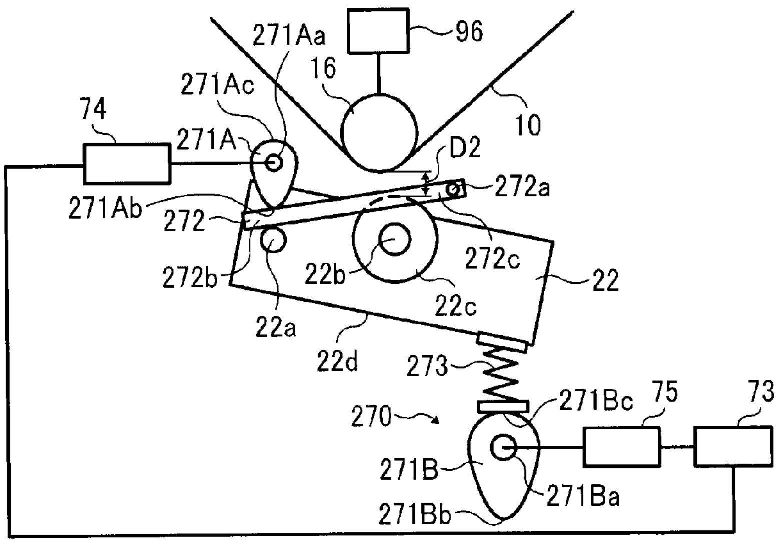
FIG. 7C is a vertical sectional view of the intermediate transfer belt, the secondary transfer device, and the secondary transfer device separator shown in FIG. 7A in a state in which the secondary transfer device is isolated from the intermediate transfer belt at a second isolation position.

Referring to FIGS. 7A, 7B, and 7C, the following describes a configuration of a secondary transfer device separator 270 incorporated in the image forming apparatus 100 depicted in FIG. 1 according to a third exemplary embodiment.

The secondary transfer device separator 270 moves the secondary transfer device 22 with respect to the intermediate transfer belt 10.

A detailed description is now given of a construction and an operation of the secondary transfer device separator 270.

FIG. 7A is a vertical sectional view of the intermediate transfer belt 10, the secondary transfer device 22, and the secondary transfer device separator 270 that brings the secondary transfer device 22 into contact with the intermediate transfer belt 10 at a contact position. FIG. 7B is a vertical sectional view of the intermediate transfer belt 10, the secondary transfer device 22, and the secondary transfer device separator 270 that isolates the secondary transfer device 22 from the intermediate transfer belt 10 at a first isolation position. FIG. 7C is a vertical sectional view of the intermediate transfer belt 10, the secondary transfer device 22, and the secondary transfer device separator 270 that isolates the secondary transfer device 22 from the intermediate transfer belt 10 at a second isolation position.

Like the secondary transfer device separator 170 depicted in FIGS. 6A to 6C, the secondary transfer device separator 270 isolates the secondary transfer device 22 from the intermediate transfer belt 10 with the first interval D1 and the second interval D2 greater than the first interval D1 therebetween. However, unlike the secondary transfer device separator 170, the secondary transfer device separator 270 moves the secondary transfer device 22 by using two cams, that is, a first cam 271A and a second cam 271B.

For example, the secondary transfer device separator 270 is constructed of the first cam 271A, the second cam 271B, an arm 272, and a compressing spring 273. The first cam 271A presses against a free end 272*b* of the arm 272, that is, a left end in FIG. 7A disposed downstream from the secondary transfer roller 22*c* in a recording medium conveyance direction C1. The arm 272 is swingable about a swing shaft 272*a* mounted on a fixed end 272*c* of the arm 272, that is, a right end in FIG. 7A disposed upstream from the secondary transfer roller 22*c* in the recording medium conveyance direction C1. A substantial center of the arm 272 in the recording medium conveyance direction C1 contacts a roller shaft 22*b* of the secondary transfer roller 22*c* at each axial end of the secondary transfer roller 22*c* in an axial direction thereof. As the first cam 271A rotates by 180 degrees from the contact position shown in FIG. 7A to the first isolation position shown in FIG. 7B and the second isolation position shown in FIG. 7C, the first cam 271A lowers the free end 272*b* of the arm 272 and therefore rotates the arm 272 about the swing shaft 272*a*. Accordingly, the arm 272 presses down the roller shaft 22*b* of the secondary transfer roller 22*c*, thus isolating the secondary transfer device 22 from the intermediate transfer belt 10.

The second cam 271B contacts the compression spring 273 anchored to a lower face 22*d* of the secondary transfer device 22. The compression spring 273 constantly biases the secondary transfer device 22 upward. Accordingly, the roller shaft 22*b* of the secondary transfer roller 22*c* rotates the arm 272 to constantly move the free end 272*b* of the arm 272 upward, keeping the free end 272*b* of the arm 272 in contact with an outer circumferential face of the first cam 271A.

As shown in FIG. 7A, a first driver 74 (e.g., a motor) is connected to the first cam 271A and a second driver 75 is connected to the second cam 271B. The first driver 74 and the second driver 75 are operatively connected to the controller 73. As the controller 73 controls the first driver 74 to rotate the first cam 271A by 180 degrees from the contact position shown in FIG. 7A where the secondary transfer device 22 contacts the intermediate transfer belt 10, the first cam 271A lowers the free end 272*b* of the arm 272 and the roller shaft 22*b* of the secondary transfer roller 22*c*, thus moving the secondary transfer device 22 to the first isolation position shown in FIG. 7B where the secondary transfer device 22 is isolated from the intermediate transfer belt 10 with the first interval D1 therebetween. At the first isolation position, since the compression spring 273 biases the secondary transfer device 22 upward, the roller shaft 22*b* of the secondary transfer roller 22*c* contacting the arm 272 retains the secondary transfer roller 22*c* at the first isolation position shown in FIG. 7B where the secondary transfer roller 22*c* is isolated from the intermediate transfer belt 10 with the first interval D1 therebetween.

Conversely, as the controller 73 controls the second driver 75 to rotate the second cam 271B by 180 degrees from the first isolation position shown in FIG. 7B, a lower end of the compression spring 273 lowers and decreases an amount of compression of the compression spring 273, thus decreasing bias of the compressing spring 273 that biases the secondary transfer device 22 upward. Accordingly, weight of the secondary transfer device 22 lowers an upper end of the compression spring 273, thus retaining the secondary transfer device 22 at the second isolation position shown in FIG. 7C where weight of the secondary transfer device 22 and bias of the compression spring 273 are balanced. Consequently, the secondary transfer device 22 moves to the second isolation position shown in FIG. 7C where the secondary transfer device 22 is isolated from the intermediate transfer belt 10 with the second interval D2 therebetween greater than the first interval D1 created at the first isolation position shown in FIG. 7B.

Figure 8:
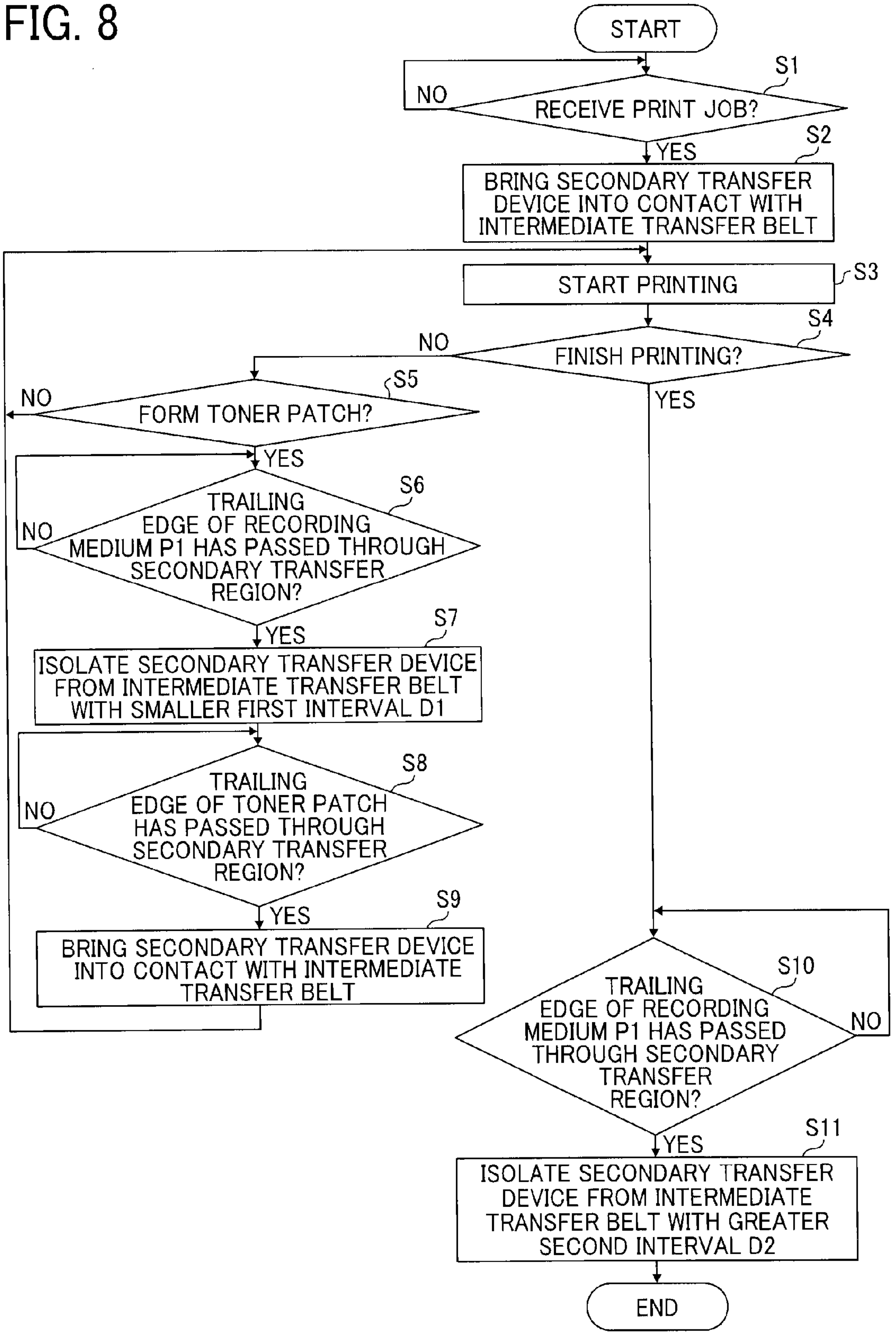
FIG. 8 is a flowchart illustrating first control processes for moving the secondary transfer device shown in FIGS. 6A to 6C with respect to the intermediate transfer belt.

Referring to FIG. 8, the following describes an example of a first control method for moving the secondary transfer device 22 with respect to the intermediate transfer belt 10.

It is to be noted that although the first control method below uses the secondary transfer device separator 170 shown in FIGS. 6A to 6C, basic processes of the first control method are also applicable to the secondary transfer device separator 70 shown in FIGS. 4A and 4B, the secondary transfer device separator 270 shown in FIGS. 7A to 7C, and other secondary transfer device separators.

FIG. 8 is a flowchart illustrating control processes of the first control method for moving the secondary transfer device 22 with respect to the intermediate transfer belt 10.

In step S1, the controller 73 receives a print job. If the controller 73 receives the print job (YES in step S1), the controller 73 controls the driver 72 to rotate the cam 171 clockwise in FIG. 6C by 90 degrees from the second isolation position shown in FIG. 6C to the contact position shown in FIG. 6A to bring the secondary transfer device 22 into contact with the intermediate transfer belt 10 before the first recording medium P1 enters the secondary transfer region N in step S2. In step S3, the controller 73 starts printing, that is, the image forming operation described above, on the first recording medium P1. In step S4, the controller 73 determines whether or not printing is finished, that is, whether or not there is a toner image to be transferred onto the intermediate transfer belt 10. If the controller 73 determines that printing is finished (YES in step S4), the controller 73 determines whether or not a tailing edge of the first recording medium P1 has passed through the secondary transfer region N in step S10. If the controller 73 determines that the trailing edge of the first recording medium P1 has passed through the secondary transfer region N (YES in step S10), the controller 73 controls the driver 72 to rotate the cam 171 counterclockwise in FIG. 6A by 90 degrees from the contact position shown in FIG. 6A to the second isolation position shown in FIG. 6C, isolating the secondary transfer device 22 from the intermediate transfer belt 10 with the greater second interval D2 therebetween in step S11.

On the other hand, if the controller 73 determines that printing is not finished, that is, if the controller 73 determines that there is the subsequent, second toner image T2 to be transferred onto the intermediate transfer belt 10 (NO in step S4), the controller 73 determines whether or not to form a toner patch TP on the intermediate transfer belt 10 in the toner patch section 51 thereon interposed between the first toner image T1 transferred onto the first recording medium P1 and the subsequent, second toner image T2 to be transferred next onto the second recording medium P2 in step S5. If the controller 73 determines not to form the toner patch TP (NO in step S5), the controller 73 starts transferring the second toner image T2 onto the intermediate transfer belt 10 at a predetermined time. Even while the blank section S2, without the toner patch TP, on the intermediate transfer belt 10 interposed between the preceding, second toner image T2 transferred onto the second recording medium P2 and the subsequent, third toner image T3 passes through the secondary transfer region N, the secondary transfer device 22 remains in contact with the intermediate transfer belt 10 at the contact position shown in FIG. 6A. Accordingly, a passage time for which the blank section S2 of the intermediate transfer belt 10 passes through the secondary transfer region N is not restricted by a speed at which the secondary transfer device separator 170 isolates the secondary transfer device 22 from the intermediate transfer belt 10. Consequently, the passage time of the blank section S2 of the intermediate transfer belt 10 is shortened to a period of time that is available in the image forming apparatus 100.

If the controller 73 determines to form the toner patch TP and therefore the toner patch TP is created on the intermediate transfer belt 10 in the toner patch section S1 between the first toner image T1 already transferred onto the intermediate transfer belt 10 and the second toner image T2 to be transferred onto the intermediate transfer belt 10 (YES in step S5), the controller 73 determines whether or not the tailing edge of the first recording medium P1 bearing the first toner image T1 has passed through the secondary transfer region N in step S6. If the controller 73 determines that the trailing edge of the first recording medium P1 has passed through the secondary transfer region N (YES in step S6), the controller 73 controls the driver 72 to rotate the cam 171 counterclockwise in FIG. 6A by 180 degrees from the contact position shown in FIG. 6A to the first isolation position shown in FIG. 6B within the shortened time M1, isolating the secondary transfer device 22 from the intermediate transfer belt 10 with the smaller first interval D1 therebetween in step S7 before the toner patch TP formed on the intermediate transfer belt 10 enters the secondary transfer region N.

In step S8, the controller 73 determines whether or not a trailing edge of the toner patch TP has passed through the secondary transfer region N. If the controller 73 determines that the trailing edge of the toner patch TP has passed through the secondary transfer region N (YES in step S8), the controller 73 controls the driver 72 to rotate the cam 171 clockwise in FIG. 6B by 180 degrees from the first isolation position shown in FIG. 6B to the contact position shown in FIG. 6A within the shortened time M2, bringing the secondary transfer device 22 into contact with the intermediate transfer belt 10 in step S9 before the subsequent, second recording medium P2 enters the secondary transfer region N. Thereafter, the controller 73 starts transferring the second toner image T2 from the intermediate transfer belt 10 onto the second recording medium P2 at a predetermined time. While the toner patch TP formed in the toner patch section S1 on the intermediate transfer belt 10 interposed between the first toner image T1 transferred onto the first recording medium P1 and the subsequent, second toner image T2 passes through the secondary transfer region N, the secondary transfer device 22 remains in isolation from the intermediate transfer belt 10 at the first isolation position shown in FIG. 6B. Accordingly, the toner patch TP does not come into contact with the secondary transfer device 22 and therefore toner of the toner patch TP does not adhere to the secondary transfer device 22. Consequently, even if the subsequent, second recording medium P2 passes through the secondary transfer region N, toner of the toner patch TP does not adhere to and stain the back side of the second recording medium P2.

Figure 9:
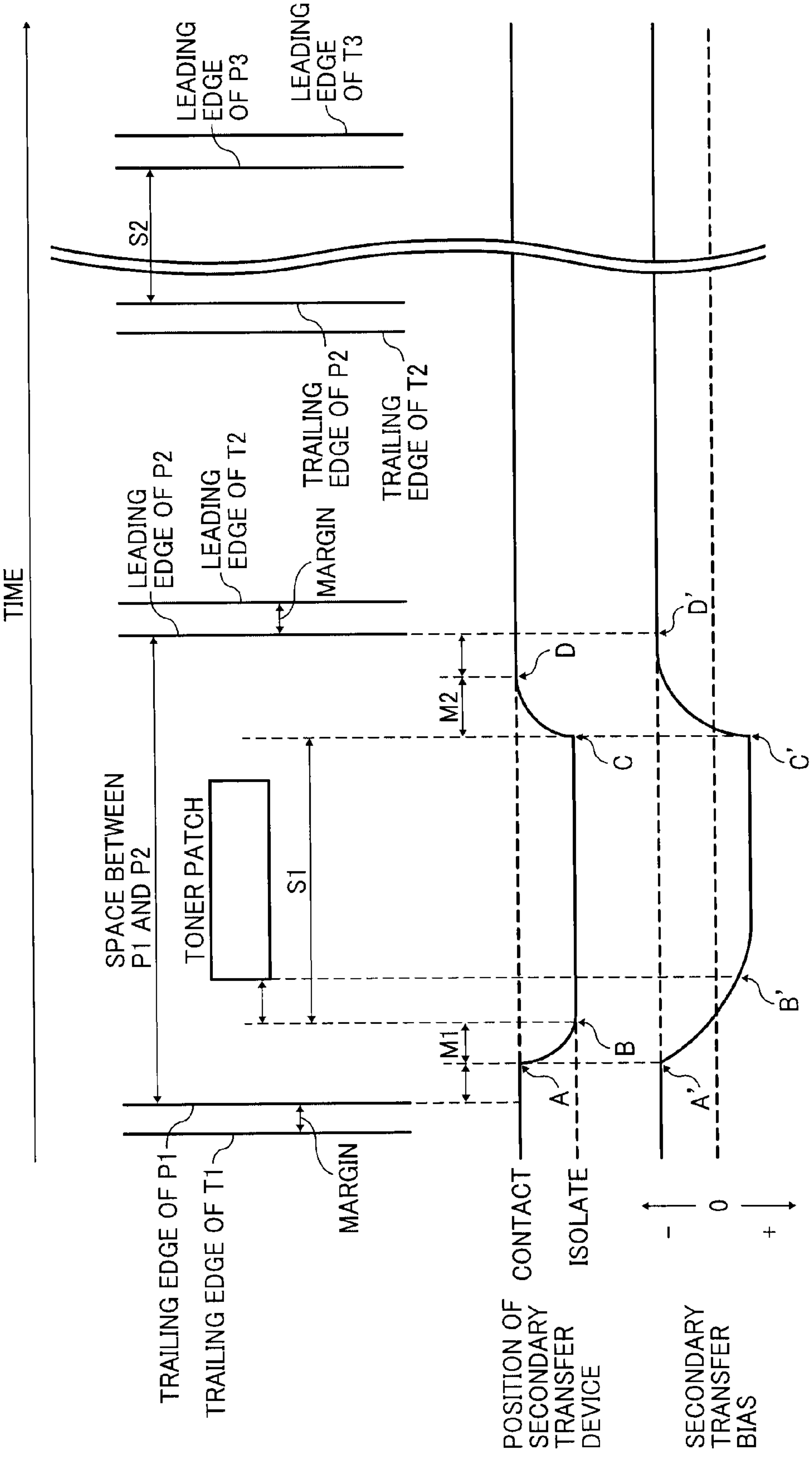
FIG. 9 is a diagram of a control method according to a fourth exemplary embodiment.

Referring to FIG. 9, the following describes a control method for moving the secondary transfer device 22 with respect to the intermediate transfer belt 10 according to a fourth exemplary embodiment.

It is to be noted that the control method described below is applicable to the secondary transfer device separator 70 shown in FIGS. 4A and 4B, the secondary transfer device separator 170 shown in FIGS. 6A to 6C, and the secondary transfer device separator 270 shown in FIGS. 7A to 7C.

According to the fourth exemplary embodiment, a secondary transfer bias applied at the secondary transfer region N is switched between a negative bias and a positive bias. As shown in FIGS. 4A, 4B, 6A to 6C, and 7A to 7C, a secondary transfer bias applicator 96 connected to the support roller 16 applies a secondary transfer bias to the support roller 16. For example, while the secondary transfer device 22 is isolated from the intermediate transfer belt 10, the secondary transfer region N is applied with a positive secondary transfer bias opposite a negative secondary transfer bias applied while the secondary transfer device 22 contacts the intermediate transfer belt 10 to transfer the toner image formed on the intermediate transfer belt 10 onto the recording medium. FIG. 9 is a diagram of a control method according to the fourth exemplary embodiment illustrating a time when the first to third recording media P1 to P3 bearing the first to third toner images T1 to T3 and the toner patch TP formed on the intermediate transfer belt 10 pass through the secondary transfer region N and a time when the secondary transfer device 22 comes into contact with and isolation from the intermediate transfer belt 10.

Generally, the toner image formed on the intermediate transfer belt 10 is transferred onto the recording medium by two bias application methods. A first method is to apply a secondary transfer bias having a polarity identical to a polarity of toner to the support roller 16 contacting an inner circumferential surface of the intermediate transfer belt 10. A second method is to apply a secondary transfer bias having a polarity opposite a polarity of toner to the secondary transfer device 22 contacting the back side of the recording medium. According to the fourth exemplary embodiment, the first method of applying a negative secondary transfer bias identical to the negative polarity of toner to the support roller 16 is employed. However, the second method is also applicable.

As shown in FIG. 9, after the trailing edge of the preceding, first recording medium P1 passes through the secondary transfer region N formed between the secondary transfer device 22 and the intermediate transfer belt 10, the secondary transfer bias applied from the secondary transfer bias applicator 96 to the support roller 16 is switched from negative to positive at a time A'. Hence, by a time B' when the toner patch TP enters the secondary transfer region N, the secondary transfer bias has been turned positive. At a time C' when the toner patch TP has passed through the secondary transfer region N, the secondary transfer bias is switched from positive to negative. By a time D' before the leading edge of the subsequent, second recording medium P2 enters the secondary transfer region N, the secondary transfer bias has been turned negative. That is, while the toner patch section S1 on the intermediate transfer belt 10 defined as an interval between the time B and the time C passes through the secondary transfer region N, the secondary transfer device 22 is isolated from the intermediate transfer belt 10. After the time D, the secondary transfer device 22 remains in contact with the intermediate transfer belt 10 while the second recording medium P2, the blank section S2 on the intermediate transfer belt 10 without the toner patch TP interposed between the second recording medium P2 and the third recording medium P3, and the third recording medium P3 are conveyed through the secondary transfer region N.

Figure 10:
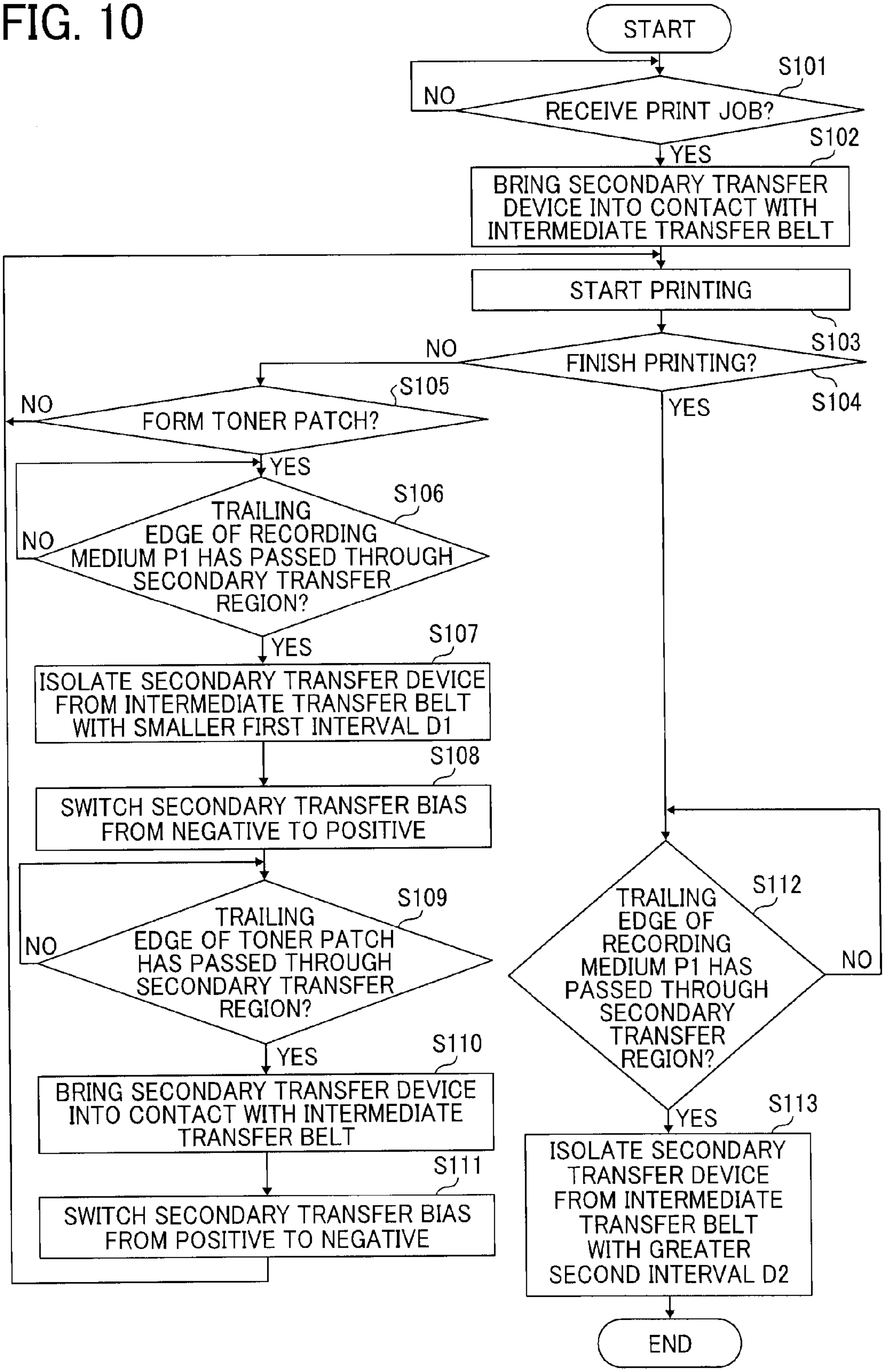
FIG. 10 is a flowchart illustrating second control processes for moving the secondary transfer device shown in FIGS. 6A to 6C with respect to the intermediate transfer belt.

Referring to FIG. 10, the following describes an example of a second control method for moving the secondary transfer device 22 with respect to the intermediate transfer belt 10.

It is to be noted that although the second control method below uses the secondary transfer device separator 170 shown in FIGS. 6A to 6C, basic processes of the second control method are also applicable to the secondary transfer device separator 70 shown in FIGS. 4A and 4B, the secondary transfer device separator 270 shown in FIGS. 7A to 7C, and other secondary transfer device separators.

FIG. 10 is a flowchart illustrating control processes of the second control method for moving the secondary transfer device 22 with respect to the intermediate transfer belt 10.

In step S101, the controller 73 receives a print job. If the controller 73 receives the print job (YES in step S101), the controller 73 controls the driver 72 to rotate the cam 171 clockwise in FIG. 6C by 90 degrees from the second isolation position shown in FIG. 6C to the contact position shown in FIG. 6A to bring the secondary transfer device 22 into contact with the intermediate transfer belt 10 before the first recording medium P1 enters the secondary transfer region N in step S102. In step S103, the controller 73 starts printing, that is, the image forming operation described above, on the first recording medium P1. In step S104, the controller 73 determines whether or not printing is finished, that is, whether or not there is a toner image to be transferred onto the intermediate transfer belt 10. If the controller 73 determines that printing is finished (YES in step S104), the controller 73 determines whether or not a tailing edge of the first recording medium P1 has passed through the secondary transfer region N in step S112. If the controller 73 determines that the trailing edge of the first recording medium P1 has passed through the secondary transfer region N (YES in step S112), the controller 73 controls the driver 72 to rotate the cam 171 counterclockwise in FIG. 6A by 90 degrees from the contact position shown in FIG. 6A to the second isolation position shown in FIG. 6C, isolating the secondary transfer device 22 from the intermediate transfer belt 10 with the greater second interval D2 therebetween in step S113.

On the other hand, if the controller 73 determines that printing is not finished, that is, if the controller 73 determines that there is the subsequent, second toner image T2 to be transferred onto the intermediate transfer belt 10 (NO in step S104), the controller 73 determines whether or not to form a toner patch TP on the intermediate transfer belt 10 in the toner patch section 51 thereon interposed between the first toner image T1 transferred onto the first recording medium P1 and the subsequent, second toner image T2 to be transferred next in step S105. If the controller 73 determines not to form the toner patch TP (NO in step S105), the controller 73 starts transferring the second toner image T2 onto the intermediate transfer belt 10 at a predetermined time. Even while the blank section S2, without the toner patch TP, on the intermediate transfer belt 10 interposed between the preceding, second toner image T2 transferred onto the second recording medium P2 and the subsequent, third toner image T3 passes through the secondary transfer region N, the secondary transfer device 22 remains in contact with the intermediate transfer belt 10 at the contact position shown in FIG. 6A. Accordingly, a passage time for which the blank section S2 of the intermediate transfer belt 10 passes through the secondary transfer region N is not restricted by a speed at which the secondary transfer device separator 170 isolates the secondary transfer device 22 from the intermediate transfer belt 10. Consequently, the passage time of the blank section S2 of the intermediate transfer belt 10 is shortened to a period of time that is available in the image forming apparatus 100.

If the controller 73 determines to form the toner patch TP and therefore the toner patch TP is created on the intermediate transfer belt 10 in the toner patch section S1 between the first toner image T1 already transferred onto the intermediate transfer belt 10 and the second toner image T2 to be transferred onto the intermediate transfer belt 10 (YES in step S105), the controller 73 determines whether or not the tailing edge of the first recording medium P1 bearing the first toner image T1 has passed through the secondary transfer region N in step S106. If the controller 73 determines that the trailing edge of the first recording medium P1 has passed through the secondary transfer region N (YES in step S106), the controller 73 controls the driver 72 to rotate the cam 171 counterclockwise in FIG. 6A by 180 degrees from the contact position shown in FIG. 6A to the first isolation position shown in FIG. 6B within the shortened time M1, isolating the secondary transfer device 22 from the intermediate transfer belt 10 with the smaller first interval D1 therebetween in step S107 before the toner patch TP formed on the intermediate transfer belt 10 enters the secondary transfer region N. Simultaneously, the secondary transfer bias applicator 96 switches the secondary transfer bias applied to the support roller 16 from negative to positive in step S108.

In step S109, the controller 73 determines whether or not a trailing edge of the toner patch TP has passed through the secondary transfer region N. If the controller 73 determines that the trailing edge of the toner patch TP has passed through the secondary transfer region N (YES in step S109), the controller 73 controls the driver 72 to rotate the cam 171 clockwise in FIG. 6B by 180 degrees from the first isolation position shown in FIG. 6B to the contact position shown in FIG. 6A within the shortened time M2, bringing the secondary transfer device 22 into contact with the intermediate transfer belt 10 in step S110 before the subsequent, second recording medium P2 enters the secondary transfer region N. Simultaneously, the secondary transfer bias applicator 96 switches the secondary transfer bias applied to the support roller 16 from positive to negative in step S111.

Thereafter, the controller 73 starts transferring the second toner image T2 from the intermediate transfer belt 10 onto the second recording medium P2 at a predetermined time. While the toner patch TP formed in the toner patch section S1 on the intermediate transfer belt 10 interposed between the first toner image T1 transferred onto the first recording medium P1 and the subsequent, second toner image T2 passes through the secondary transfer region N, the secondary transfer device 22 remains in isolation from the intermediate transfer belt 10 at the first isolation position shown in FIG. 6B. Accordingly, the toner patch TP does not come into contact with the secondary transfer device 22 and therefore toner of the toner patch TP does not adhere to the secondary transfer device 22. Consequently, even if the subsequent, second recording medium P2 passes through the secondary transfer region N, toner of the toner patch TP does not adhere to and stain the back side of the second recording medium P2.

Figure 11:
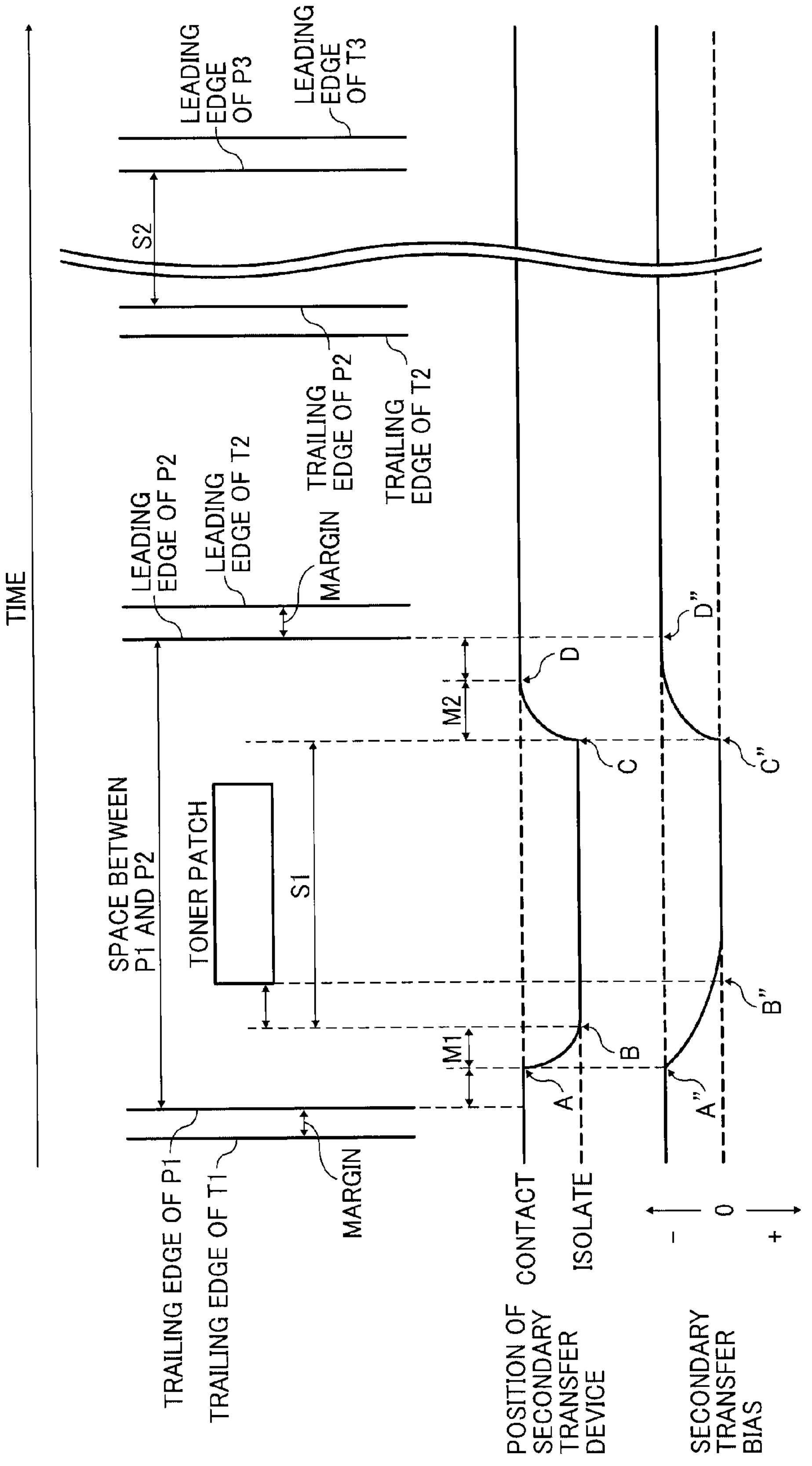
FIG. 11 is a diagram of a comparative control method.

Referring to FIG. 11, the following describes a comparative control method for turning the secondary transfer bias off while the secondary transfer device 22 is isolated from the intermediate transfer belt 10 instead of applying the positive secondary transfer bias as shown in FIG. 9.

FIG. 11 is a diagram of the comparative control method illustrating a time when the first to third recording media P1 to P3 bearing the first to third toner images T1 to T3 and the toner patch TP formed on the intermediate transfer belt 10 pass through the secondary transfer region N and a time when the secondary transfer device 22 comes into contact with and isolation from the intermediate transfer belt 10.

As shown in FIG. 11, after the trailing edge of the preceding, first recording medium P1 passes through the secondary transfer region N formed between the secondary transfer device 22 and the intermediate transfer belt 10, the secondary transfer bias is switched off at a time A". Hence, at a time B" when the toner patch TP enters the secondary transfer region N, the secondary transfer bias may not have reached zero. At a time C" when the toner patch TP has passed through the secondary transfer region N, the secondary transfer bias is switched on. By a time D" before the leading edge of the subsequent, second recording medium P2 enters the secondary transfer region N, the secondary transfer bias has been turned negative.

Switching off the secondary transfer bias according to the comparative control method shown in FIG. 11 may take longer to turn the secondary transfer bias to zero based on performance of a power supply compared to the fourth exemplary embodiment shown in FIG. 9. Further, the secondary transfer bias may not have reached zero at the time B" when the toner patch TP enters the secondary transfer region N. In this case, a potential difference between the intermediate transfer belt 10 and the secondary transfer device 22 may move and spatter toner onto the secondary transfer device 22, thus staining the secondary transfer device 22 with toner.

To address this problem, according to the fourth exemplary embodiment shown in FIG. 9, while the secondary transfer device 22 is isolated from the intermediate transfer belt 10 after the trailing edge of the preceding, first recording medium P1 is discharged from the secondary transfer region N and before the leading edge of the subsequent, second recording medium P2 enters the secondary transfer region N, the secondary transfer bias is switched to positive, that is, a polarity opposite the negative polarity of toner. Accordingly, an electric field is applied to the toner patch TP formed on the intermediate transfer belt 10 in a direction away from the secondary transfer device 22. Accordingly, toner does not spatter from the intermediate transfer belt 10 onto the secondary transfer device 22 and stain the secondary transfer device 22. Although it takes some time to switch the polarity of the secondary transfer bias based on performance of the power supply, the potential difference between the secondary transfer device 22 and the intermediate transfer belt 10 is turned to zero within a shortened time before the time B' shown in FIG. 9 compared to the comparative control method for turning the secondary transfer bias off as shown in FIG. 11.

Generally, the secondary transfer bias is under constant current control to retain a predetermined transfer electric field even if the resistance of the recording medium and the secondary transfer device 22 changes. However, if the secondary transfer bias is switched from negative to positive while the secondary transfer device 22 is isolated from the intermediate transfer belt 10, such isolation may obstruct or hinder passage of an electric current. Accordingly, if the positive secondary transfer bias applied while the secondary transfer device 22 is isolated from the intermediate transfer belt 10 is under constant current control, voltage is substantially increased for passage of a predetermined electric current. Consequently, the electric current may leak to an inappropriate location, degrading the toner image formed on the recording medium or damaging the components incorporated in the image forming apparatus 100.

To address this problem, according to the fourth exemplary embodiment shown in FIG. 9, the positive secondary transfer bias applied while the secondary transfer device 22 is isolated from the intermediate transfer belt 10 is constant voltage controlled, preventing the above-described problem due to abnormal increase of voltage and spattering of toner from the intermediate transfer belt 10 onto the secondary transfer device 22.

The following describes advantages of the secondary transfer device separators 70, 170, and 270 and the control methods described above. As shown in FIGS. 1, 4A, 4B, 6A, 6B, 6C, 7A, 7B, and 7C, the image forming apparatus 100 includes the intermediate transfer belt 10 serving as a toner image carrier that carries a toner image formed thereon according to image data; the secondary transfer device 22 serving as a transfer device separatably contacting the intermediate transfer belt 10 to form the secondary transfer region N therebetween; the registration roller pair 49 serving as a recording medium feeder that feeds a recording medium to the secondary transfer region N; and the secondary transfer device separator 70, 170, or 270 serving as a transfer device separator that moves the secondary transfer device 22 with respect to the intermediate transfer belt 10. As the recording medium is conveyed through the secondary transfer region N formed between the intermediate transfer belt 10 and the secondary transfer device 22 by the secondary transfer device separator 70, 170, or 270 that brings the secondary transfer device 22 into contact with the intermediate transfer belt 10, the toner image formed on the intermediate transfer belt 10 is transferred onto the recording medium, thus forming the toner image on the recording medium according to the image data.

If the image forming apparatus 100 receives a print job for forming a toner image on three or more recording media continuously, that is, a multiple print job, the image forming apparatus 100 forms a toner patch TP, that is, a non-transfer toner image not to be transferred onto a recording medium, on the intermediate transfer belt 10 at one of a plurality of gaps between successive toner images. The controller 73 controls the secondary transfer device separator 70, 170, or 270 to bring the secondary transfer device 22 into contact with the intermediate transfer belt 10 while the toner image formed on the intermediate transfer belt 10 is transferred onto the recording medium. Conversely, the controller 73 controls the secondary transfer device separator 70, 170, or 270 to isolate the secondary transfer device 22 from the intermediate transfer belt 10 while the toner patch TP interposed between the first toner image T1 transferred onto the first recording medium P1 and the second toner image T2 to be transferred onto the second recording medium P2 passes through the secondary transfer region N. Accordingly, the toner patch TP does not come into contact with the secondary transfer device 22 and therefore toner of the toner patch TP does not stain the secondary transfer device 22. Consequently, even if the subsequent, second recording medium P2 passes through the secondary transfer region N, toner does not adhere to and stain the back side of the subsequent, second recording medium P2.

When at least one gap between a preceding toner image and a subsequent toner image adjacent to the preceding toner image on the intermediate transfer belt 10 where no toner patch TP is formed passes through the secondary transfer region N, that is, when the blank section S2 between the second recording medium P2 and the third recording medium P3 passes through the secondary transfer region N, the controller 73 controls the secondary transfer device separator 70, 170, or 270 to retain the secondary transfer device 22 in contact with the intermediate transfer belt 10 even during interval between a preceding transfer of transferring the second toner image T2 onto the second recording medium P2 and a subsequent transfer of transferring the third toner image T3 onto the third recording medium P3, not isolating the secondary transfer device 22 from the intermediate transfer belt 10. Accordingly, the gap between the successive toner images on the intermediate transfer belt 10 that carries no toner patch TP, that is, the blank section S2 interposed between the second toner image T2 and the third toner image T3, remains in contact with the secondary transfer device 22, eliminating a time required to isolate the secondary transfer device 22 from the intermediate transfer belt 10 and thus shortening a time for which the gap between the successive toner images, that is, the blank section S2 interposed between the second toner image T2 and the third toner image T3, passes through the secondary transfer region N regardless of the speed at which the secondary transfer device separator 70, 170, or 270 isolates the secondary transfer device 22 from the intermediate transfer belt 10.

That is, compared to conventional image forming apparatuses in which all of the gaps between the successive toner images pass through the secondary transfer region N for an extended time increased by the speed at which the secondary transfer device 22 is isolated from the intermediate transfer belt 10, the image forming apparatus 100 shortens the time required to complete the multiple print job, improving productivity of the image forming apparatus 100. For example, a passage time required for the gap between the successive toner images on the intermediate transfer belt 10 that carries no toner patch TP, that is, the blank section S2 interposed between the second toner image T2 and the third toner image T3, to pass through the secondary transfer region N in a state in which the secondary transfer device 22 contacts the intermediate transfer belt 10 is shorter than a passage time required for the gap between the successive toner images on the intermediate transfer belt 10 that carries the toner patch TP, that is, the toner patch section S1 interposed between the first toner image T1 and the second toner image T2, to pass through the secondary transfer region N in a state in which the secondary transfer device 22 is isolated from the intermediate transfer belt 10, thus shortening the time required to complete the multiple print job and improving productivity of the image forming apparatus 100.

As shown in FIGS. 6A to 7C, the secondary transfer device separators 170 and 270 isolate the secondary transfer device 22 from the intermediate transfer belt 10 with at least two switchable intervals therebetween, that is, the first interval D1 and the second interval D2 greater than the first interval D1. The controller 73 controls the secondary transfer device separators 70, 170, and 270 to move the secondary transfer device 22 with respect to the intermediate transfer belt 10 even at a predetermined time other than a multiple print job, for example, immediately after such multiple print job is finished.

In order to isolate the secondary transfer device 22 from the intermediate transfer belt 10 during passage of the toner patch TP through the secondary transfer region N, the controller 73 controls the secondary transfer device separator 70, 170, or 270 to isolate the secondary transfer device 22 from the intermediate transfer belt 10 with the first interval D1 smaller than the second interval D2 with which the secondary transfer device 22 is isolated from the intermediate transfer belt 10 immediately after a multiple print job is finished. Accordingly, control for isolating the secondary transfer device 22 from the intermediate transfer belt 10 while the toner patch TP passes through the secondary transfer region N shortens the time required to isolate the secondary transfer device 22 from the intermediate transfer belt 10 compared to control for isolating the secondary transfer device 22 from the intermediate transfer belt 10 immediately after a multiple print job is finished. Consequently, the time required to complete a multiple print job is shortened, improving productivity of the image forming apparatus 100.

According to the above-described exemplary embodiments, immediately after a multiple print job is finished, toner contained in the development devices 61Y, 61M, 61C, and 61K depicted in FIG. 1 is discharged to replace waste toner with fresh toner. The discharged waste toner is supplied from the development devices 61Y, 61M, 61C, and 61K onto the photoconductors 40Y, 40M, 40C, and 40K, respectively, and is further transferred from the photoconductors 40Y, 40M, 40C, and 40K onto the intermediate transfer belt 10. Then, the belt cleaner 17 for cleaning the intermediate transfer belt 10 collects the transferred waste toner from the intermediate transfer belt 10. An amount of waste toner transferred onto the intermediate transfer belt 10 is substantially greater than an amount of toner of the toner patch TP.

As described above, the secondary transfer device 22 is isolated from the intermediate transfer belt 10 with the smaller first interval D1 therebetween while the toner patch TP passes through the secondary transfer region N to prevent adhesion of toner of the toner patch TP to the secondary transfer device 22 and at the same time shorten the time to isolate the secondary transfer device 22 from the intermediate transfer belt 10. However, if the secondary transfer device 22 is isolated from the intermediate transfer belt 10 with the smaller first interval D1 therebetween even while the waste toner discharged from the development devices 61Y, 61M, 61C, and 61K and transferred onto the intermediate transfer belt 10 passes through the secondary transfer region N, the waste toner of which amount is greater than the amount of toner of the toner patch TP may adhere to the secondary transfer device 22.

To address this problem, the secondary transfer device separators 170 and 270 depicted in FIGS. 6A to 7C isolate the secondary transfer device 22 from the intermediate transfer belt 10 with the two switchable intervals, that is, the first interval D1 and the second interval D2 therebetween, thus minimizing adhesion of the waste toner to the secondary transfer device 22 immediately after a multiple print job is finished while preventing adhesion of toner of the toner patch TP to the secondary transfer device 22 and at the same time shortening the time to isolate the secondary transfer device 22 from the intermediate transfer belt 10.

The secondary transfer device separators 170 and 270 move the secondary transfer device 22 from the first isolation position shown in FIGS. 6B and 7B or the second isolation position shown in FIGS. 6C and 7C to the contact position shown in FIGS. 6A and 7A and vise versa with a single motion, that is, a single movement of the cams 171, 271A, and 271B, with the simple configuration of the secondary transfer device separators 170 and 270. For example, as shown in FIGS. 6A to 6C, the secondary transfer device separator 170 includes the cam 171 having the farthest face 171*b*, the closer face 171*c*, and the closest face 171*d* that contact the contact point S on the secondary transfer device 22 and the driver 72 that rotates the cam 171 to the contact position, the first isolation position, and the second isolation position. As shown in FIGS. 7A to 7C, the secondary transfer device separator 270 includes the first cam 271A and the second cam 271B that press against the secondary transfer device 22, the first driver 74 that rotates the first cam 271A, and the second driver 75 that rotates the second cam 271B. Thus, the secondary transfer device separators 170 and 270 are simplified.

In order to form a toner image on a thick recording medium, before a leading edge of the thick recording medium enters the secondary transfer region N, the controller 73 controls the driver 72, the first driver 74, and the second driver 75 to rotate the secondary transfer device separators 70, 170, and 270, thus isolating the secondary transfer device 22 from the intermediate transfer belt 10 at the first isolation position shown in FIGS. 4B, 6B, and 7B where the toner patch TP passes through the secondary transfer region N. After the leading edge of the thick recording medium enters the secondary transfer region N, the controller 73 controls the driver 72, the first driver 74, and the second driver 75 to rotate the secondary transfer device separators 70, 170, and 270, thus bringing the secondary transfer device 22 into contact with the intermediate transfer belt 10.

As the rigid, thick recording medium enters the secondary transfer region N while the secondary transfer device 22 contacts the intermediate transfer belt 10, the leading edge of the thick recording medium strikes the intermediate transfer device 22 at an entry to the secondary transfer region N with substantial vibration transmitted to the intermediate transfer belt 10, degrading the toner image formed on the intermediate transfer belt 10. To address this problem, the secondary transfer device separators 70, 170, and 270 isolate the secondary transfer device 22 from the intermediate transfer belt 10 as the thick recording medium enters the secondary transfer region N, preventing the leading edge of the thick recording medium from striking the secondary transfer device 22 at the entry to the secondary transfer region N. Accordingly, the thick recording medium does not vibrate the intermediate transfer belt 10, preventing formation of a faulty toner image due to vibration of the intermediate transfer belt 10.

The toner patch TP created in the gap between the successive toner images, that is, the toner patch section S1 interposed between the first toner image T1 and the second toner image T2, on the intermediate transfer belt 10 during a multiple print job is a toner pattern used to adjust the density of toner of the toner images. The toner sensor 5 depicted in FIG. 1 serving as a toner detector detects an amount of toner of the toner pattern adhered to the intermediate transfer belt 10 so that adjustment of the density of the toner images, that is, a process control, is performed by the toner density adjuster 95 depicted in FIG. 3 based on the amount of toner of the toner pattern detected by the toner sensor 5. Thus, the density of the toner images is stabilized during a multiple print job. Further, the toner pattern does not adhere to the secondary transfer device 22, preventing toner of the toner pattern from moving from the secondary transfer device 22 onto the back side of the subsequent, second recording medium P2 conveyed through the secondary transfer region N.

As shown in FIG. 1, the image forming apparatus 100 is a tandem color copier employing the intermediate transfer method. For example, the image forming apparatus 100 includes the plurality of photoconductors 40Y, 40M, 40C, and 40K serving as electrostatic latent image carriers that carry electrostatic latent images and resultant yellow, magenta, cyan, and black toner images; and the intermediate transfer belt 10 serving as a toner image carrier or an intermediate transferor that carries the yellow, magenta, cyan, and black toner images transferred and superimposed on the intermediate transfer belt 10. The superimposed, yellow, magenta, cyan, and black toner images are formed into a color toner image and transferred onto a recording medium conveyed through the secondary transfer region N formed between the intermediate transfer belt 10 and the secondary transfer device 22.

Yellow, magenta, cyan, and black toner patterns are created on the photoconductors 40Y, 40M, 40C, and 40K, respectively, and then transferred onto a single gap between successive toner images on the intermediate transfer belt 10, that is, the toner patch section S1 interposed between the first toner image T1 and the second toner image T2. Accordingly, the number of gaps between successive toner images where the toner pattern is created during a multiple print job decreases, and instead the number of gaps between successive toner images where no toner pattern is created increases, thus shortening passage time for which the gaps between the successive toner images where the toner pattern is created pass through the secondary transfer region N and improving productivity of the image forming apparatus 100 during a multiple print job.

A plurality of toner sensors 5 may be provided to correspond to a plurality of toner patterns, that is, yellow, magenta, cyan, and black toner patterns, respectively. With a single toner sensor 5 configured to detect a plurality of toner patterns, it is necessary to arrange the plurality of toner patterns in the rotation direction R1 of the intermediate transfer belt 10 in such a manner that the plurality of toner patterns travels under a detection region of the toner sensor 5 successively. In this case, it is necessary to lengthen the gap between the successive toner images where the plurality of toner patterns is created in the rotation direction R1 of the intermediate transfer belt 10, increasing the time for such longer gap to pass through the secondary transfer region N and thereby degrading productivity of the image forming apparatus 100.

To address this problem, the plurality of toner sensors 5 allows the plurality of toner patterns to be arranged in a direction, that is, a width direction, orthogonal to the rotation direction R1 of the intermediate transfer belt 10 in such a manner that the plurality of toner patterns travels under the detection region of the plurality of toner sensors 5, respectively, at one time. Thus, the gap between the successive toner images where the plurality of toner patterns is created occupies a decreased length in the rotation direction R1 of the intermediate transfer belt 10 compared to the configuration in which the single toner sensor 5 detects the plurality of toner patterns, thus retaining productivity of the image forming apparatus 100.

As shown in FIG. 9, while the toner patch TP created on the intermediate transfer belt 10 passes through the secondary transfer region N in a state in which the secondary transfer device 22 is isolated from the intermediate transfer belt 10, the secondary transfer bias is switched to positive opposite to the negative polarity of toner of the toner patch TP. Accordingly, toner of the toner patch TP does not spatter from the intermediate transfer belt 10 onto the secondary transfer device 22, preventing the toner from staining the secondary transfer device 22. Further, the positive secondary transfer bias applied while the secondary transfer device 22 is isolated from the intermediate transfer belt 10 is constant voltage controlled to prevent toner of the toner patch TP from spattering from the intermediate transfer belt 10 onto the secondary transfer device 22, minimizing abnormal voltage increase and resultant failures.

The above-described exemplary embodiments are also applicable to an image forming apparatus employing a direct transfer method in which a toner image formed on a photoconductor is directly transferred onto a recording medium.

The present invention has been described above with reference to specific exemplary embodiments. Note that the present invention is not limited to the details of the embodiments described above, but various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

What is claimed is:

1. An image forming apparatus comprising:

a toner image carrier rotatable in a predetermined direction of rotation and carrying at least three, first to third toner images created successively thereon in the direction of rotation thereof to be transferred onto at least three successive recording media, respectively, as a print job, a toner patch section disposed between the first toner image and the second toner image and carrying a toner patch, and a blank section interposed between the second toner image and the third toner image;

a transfer device separatably contacting the toner image carrier to form a transfer region therebetween through which the recording media are conveyed;

a transfer device separator contacting and moving the transfer device between a contact position and a first isolation position within a shortened time, the contact position where the transfer device contacts the toner image carrier and the first isolation position where the transfer device is isolated from the toner image carrier with a first interval therebetween; and a controller operatively connected to the transfer device separator to control the transfer device separator to move the transfer device to the contact position as the first to third toner images and the blank section of the toner image carrier pass through the transfer region and to the first isolation position as the toner patch section of the toner image carrier passes through the transfer region based on a detection of the toner patch before the toner patch section passes through the transfer region.

2. The image forming apparatus according to claim 1, wherein the controller retains the transfer device in contact with the toner image carrier as the blank section of the toner image carrier passes through the transfer region after the second toner image on the toner image carrier passes through the transfer region to cause a first time for which the blank section of the toner image carrier passes through the transfer region to be shorter than a second time for which the toner patch section of the toner image carrier passes through the transfer region.

3. The image forming apparatus according to claim 1, wherein the transfer device separator further moves the transfer device to a second isolation position where the transfer device is isolated from the toner image carrier with a second interval therebetween greater than the first interval.

4. The image forming apparatus according to claim 3, wherein the controller controls the transfer device separator to move the transfer device to the second isolation position when the print job is finished.

5. The image forming apparatus according to claim 3, wherein the controller controls the transfer device separator to move the transfer device to the second isolation position when waste toner carried on the toner image carrier passes through the transfer region.

6. The image forming apparatus according to claim 3, wherein the transfer device separator includes:

a cam contacting the transfer device; and a driver connected to and rotating the cam to the contact position, the first isolation position, and the second isolation position.

7. The image forming apparatus according to claim 6, wherein the transfer device separator moves the transfer device between the contact position, the first isolation position, and the second isolation position with a single movement of the cam.

8. The image forming apparatus according to claim 3, wherein the transfer device includes a transfer roller separatably contacting the toner image carrier, wherein the transfer device separator includes:

an arm contacting the transfer roller of the transfer device;

a first cam contacting the arm and having a first farthest face with a greatest distance from a first rotation shaft thereof and a first closest face with a smallest distance from the first rotation shaft;

a compression spring anchored to a lower face of the transfer device to exert a bias to the transfer device;

a second cam contacting the compression spring and having a second farthest face with a greatest distance from a second rotation shaft thereof and a second closest face with a smallest distance from the second rotation shaft;

a first driver connected to and rotating the first cam; and a second driver connected to and rotating the second cam, and wherein as the first closest face of the first cam contacts the arm and the second farthest face of the second cam contacts the compressing spring, the transfer roller contacts the toner image carrier, as the first farthest face of the first cam contacts the arm and the second farthest face of the second cam contacts the compression spring, the transfer roller is isolated from the toner image carrier with the first interval therebetween, and as the first farthest face of the first cam contacts the arm and the second closest face of the second cam contacts the compression spring, the transfer roller is isolated from the toner image carrier with the second interval therebetween.

9. The image forming apparatus according to claim 1, wherein the controller controls the transfer device separator to move the transfer device to the first isolation position before a leading edge of a thick recording medium enters the transfer region and to the contact position after the leading edge of the thick recording medium enters the transfer region.

10. The image forming apparatus according to claim 1, further comprising:

a toner detector disposed opposite the toner image carrier to detect an amount of toner of the toner patch; and a toner density adjuster connected to the toner detector to adjust a density of toner of the second and third toner images based on the amount of toner of the toner patch detected by the toner detector.

11. The image forming apparatus according to claim 10, further comprising a plurality of electrostatic latent image carriers contacting the toner image carrier and carrying a plurality of toner patches, respectively, to be transferred onto the single toner patch section on the toner image carrier.

12. The image forming apparatus according to claim 11, wherein the toner detector includes a plurality of toner sensors to detect the plurality of toner patches on the toner image carrier, respectively.

13. The image forming apparatus according to claim 1, further comprising a support roller contacting the toner image carrier and disposed opposite the transfer device via the toner image carrier, wherein the support roller is applied with a transfer bias having a polarity opposite a polarity of toner of the toner patch as the transfer device separator moves the transfer device to the first isolation position when the toner patch section of the toner image carrier passes through the transfer region.

14. The image forming apparatus according to claim 13, wherein the transfer bias applied to the support roller as the transfer device separator moves the transfer device to the first isolation position is constant voltage controlled.

15. The image forming apparatus according to claim 1, wherein the toner image carrier includes an endless intermediate transfer belt.

16. An image forming method comprising:

receiving a print job of forming at least three, first to third toner images on at least three, first to third recording media, respectively;

bringing a transfer device into contact with a toner image carrier;

forming the first toner image on the toner image carrier;

forming a toner patch on the toner image carrier;

detecting the toner patch on the image carrier;

transferring the first toner image formed on the toner image carrier onto the first recording medium conveyed through a transfer region formed between the transfer device and the toner image carrier;

determining that a trailing edge of the first recording medium has passed through the transfer region;

isolating the transfer device from the toner image carrier within a shortened time with an interval therebetween based on the detecting of the toner patch;

determining that a trailing edge of the toner patch formed on the toner image carrier has passed through the transfer region;

bringing the transfer device into contact with the toner image carrier; and transferring the second and third toner images from the toner image carrier onto the second and third recording media, respectively, conveyed through the transfer region.

17. The image forming method according to claim 16, further comprising switching a secondary transfer bias applied to the toner image carrier from negative to positive when isolating the transfer device from the toner image carrier within the shortened time with the interval therebetween.

18. The image forming method according to claim 17, further comprising switching the secondary transfer bias applied to the toner image carrier from positive to negative when bringing the transfer device into contact with the toner image carrier.

19. An image forming apparatus comprising:

a toner image carrier rotatable in a predetermined direction of rotation and carrying at least three, first to third toner images created successively thereon in the direction of rotation thereof to be transferred onto at least three successive recording media, respectively, as a print job, a toner patch section disposed between the first toner image and the second toner image and carrying a toner patch, and a blank section interposed between the second toner image and the third toner image;

a transfer device separatably contacting the toner image carrier to form a transfer region therebetween through which the recording media are conveyed;

a transfer device separator contacting and moving the transfer device between a contact position and a first isolation position within a shortened time, the contact position where the transfer device contacts the toner image carrier and the first isolation position where the transfer device is isolated from the toner image carrier with a first interval therebetween; and a controller operatively connected to the transfer device separator to control the transfer device separator to move the transfer device to the contact position as the first to third toner images and the blank section of the toner image carrier pass through the transfer region and to the first isolation position as the toner patch section of the toner image carrier passes through the transfer region, wherein the controller retains the transfer device in contact with the toner image carrier as the blank section of the toner image carrier passes through the transfer region after the second toner image on the toner image carrier passes through the transfer region to cause a first time for which the blank section of the toner image carrier passes through the transfer region to be shorter than a second time for which the toner patch section of the toner image carrier passes through the transfer region.

* * * * *